(12) United States Patent
Zhou et al.

(10) Patent No.: US 11,678,350 B2
(45) Date of Patent: Jun. 13, 2023

(54) SELF-ADAPTIVE, INTELLIGENT CARRIER AGGREGATION WITHIN MOBILE NETWORKS

(71) Applicant: AT&T Intellectual Property I, L.P., Atlanta, GA (US)

(72) Inventors: Jianchun Zhou, Bellevue, WA (US); Yakun Gao, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 146 days.

(21) Appl. No.: 17/338,272

(22) Filed: Jun. 3, 2021

(65) Prior Publication Data
US 2022/0394718 A1    Dec. 8, 2022

(51) Int. Cl.
*H04W 72/04*     (2023.01)
*H04L 5/00*      (2006.01)
*H04W 72/52*     (2023.01)

(52) U.S. Cl.
CPC ........... *H04W 72/52* (2023.01); *H04L 5/001* (2013.01)

(58) Field of Classification Search
CPC .............. H04W 72/0486; H04L 5/001
See application file for complete search history.

(56) References Cited

U.S. PATENT DOCUMENTS

| | | | |
|---|---|---|---|
| 8,325,648 B1 * | 12/2012 | Shah | H04W 72/0486 370/380 |
| 8,625,415 B2 | 1/2014 | Sebire et al. | |
| 8,792,376 B2 * | 7/2014 | Jang | H04L 5/001 370/254 |
| 9,854,475 B2 * | 12/2017 | Harrington | H04W 28/24 |
| 10,251,075 B1 * | 4/2019 | Panchal | H04W 52/346 |
| 10,863,525 B1 * | 12/2020 | Vivanco | H04L 5/0053 |

OTHER PUBLICATIONS

Anritsu, Understanding Carrier Aggregation; Mar. 2015, pp. 1-43.
(Continued)

*Primary Examiner* — Rasheed Gidado
(74) *Attorney, Agent, or Firm* — Guntin & Gust, PLC; Ralph Trementozzi

(57) ABSTRACT

Aspects of the subject disclosure may include, for example, identifying a number of radio resources of a mobile device, detecting activity of an application, and determining a data communication requirement of the application. The data communication requirement is compared to a first component carrier capacity and responsive to it exceeding the first component carrier capacity, a number of secondary component carriers providing secondary capacities are identified according to the data communication requirement, wherein a combination of the first capacity and the number of secondary capacities is not less than the data communication requirement. A group of the radio resources is configured according to the number of secondary component carriers, wherein a number of the group of the radio resources does not exceed the maximum number of the radio resources, and wherein the data communication requirement is accommodated by the combination of the first and secondary capacities. Other embodiments are disclosed.

20 Claims, 11 Drawing Sheets

(56) References Cited

OTHER PUBLICATIONS

Carrier aggregation in 5G; https://www.ericsson.com/en/ran/carrier-aggregation; May 21, 2021; pp. 1-9.
GSMA; An Introduction to Network Slicing; 2017; pp. 1-20.
LTE Carrier Aggregation: An Overview; iGR White Paper; 2013; pp. 1-23.
Chen, Qiang et al., An overview of 5G network slicing architecture AIP Conference Proceedings 1967, 020004 (2018); pp. 1-8.
Kiwoli, Liston et al., Performance Analysis of Carrier Aggregation for Various Mobile Network Implementations Scenario Based on Spectrum Allocated; International Journal of Wireless & Mobile Networks (IJWMN) vol. 9, No. 5; Oct. 2017; pp. 1-14.
Pagin, Matteo et al., Enabling RAN Slicing Through Carrier Aggregation in mmWave Cellular Networks; IEEE MedComNet; 2020 pp. 1-8.
Reinikainen, Antti , Performance Evaluation of LTE-Advanced Carrier Aggregation; Thesis submitted for examination for the degree of Master of Science in Technology; Apr. 30, 2015; pp. 1-89.
Tanner, Aleksi , LTE-A 3CC Carrier Aggregation Helsinki Metropolia University of Applied Sciences Bachelor of Engineering Information Technology Thesis; May 10, 2016 pp. 1-55.

* cited by examiner

250

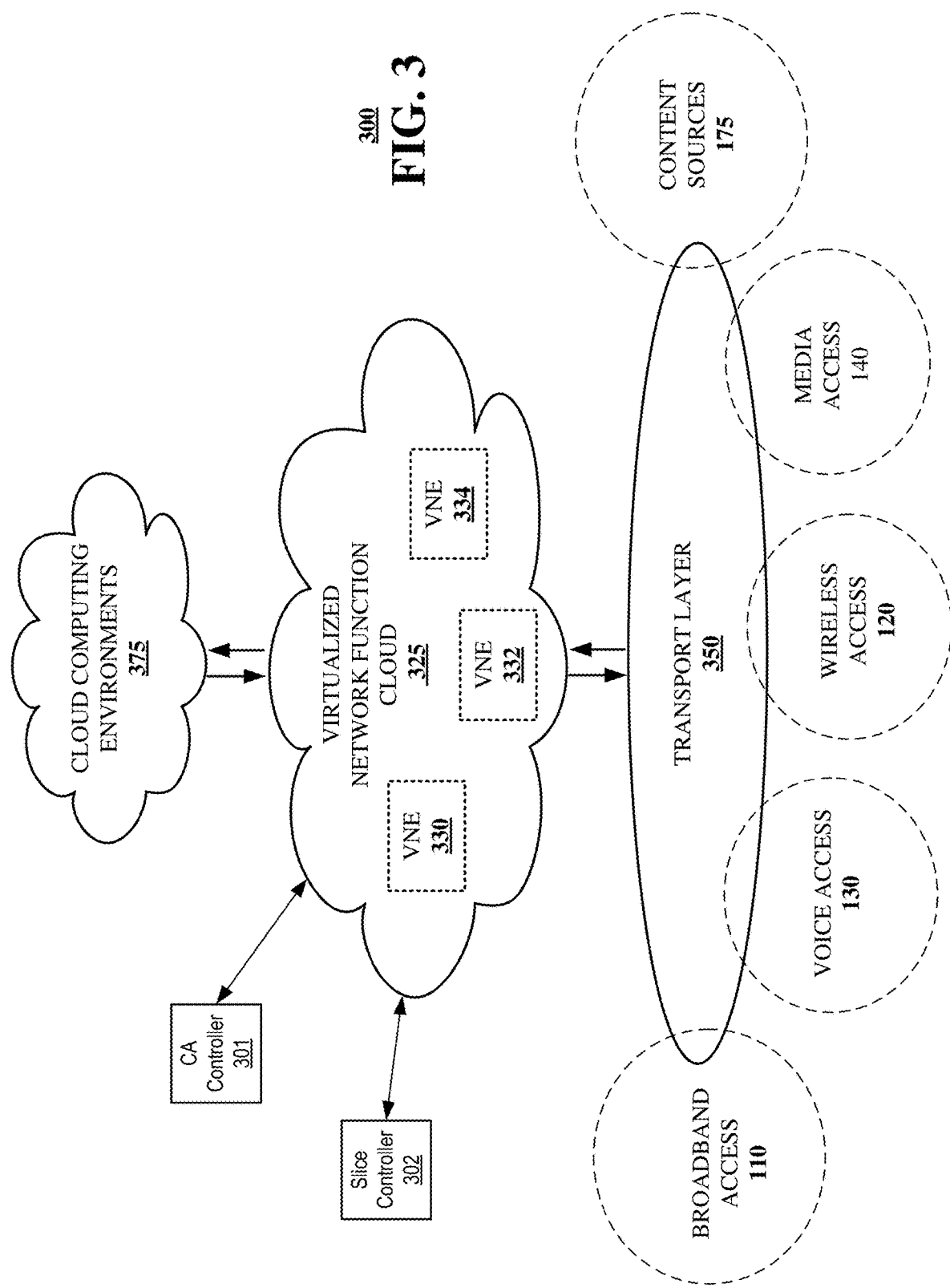

SELF-ADAPTIVE, INTELLIGENT CARRIER AGGREGATION WITHIN MOBILE NETWORKS

FIELD OF THE DISCLOSURE

The subject disclosure relates to self-adaptive, intelligent carrier aggregation within mobile networks.

BACKGROUND

Carrier aggregation (CA) allocates multiple mobile wireless carriers to user equipment (UE) of a single mobile user in order to provide a high data throughput capability. In a CA scenario, the UE is served by one cell, referred to as a primary serving cell (PCell), that supports a primary component carrier (PCC). The other component carriers of CA are referred to as secondary component carriers (SCC), served by the Secondary serving cells (SCell). The PCC represents a main carrier that may be updated during a handover and cell reselection but otherwise remains unchanged. The SCCs are auxiliary carriers to boost data rates that may be added and/or removed as required. According to current practices, the SCCs are added as a group, e.g., such that the result is all or none when it comes to the SCCs.

In its present form, CA is implemented according to a network CA configuration principle referred to as "maximum bandwidth efficiency." According to this principle, the network will always utilize all available radio resources supported by a UE's CA capability. At present, most cell sites and UEs support CA with up to five component carriers (5CC), sometimes referred to as SCCA or even seven component carriers (7CC), sometimes referred to as TCCA. Thus, when a CA data session is initiated, it is always configured at a maximum component carrier (CC) CA, e.g., as 5CCA or above.

Although multiple CCs may be configured for a single data session, e.g., including the PCC and one or more SCCs, the SCCs may not be activated until necessary. In particular, CA activation is currently driven by the network from a data buffer size and a UE's maximal CA capability. Namely, the network forces a UE to configure a CA data session according to a maximum number of CCs available at the UE, which are activated as much as possible. In practice, such network CA activation is based on a data buffer associated with the data session. The network waits for the data buffer to be nearly full, then actives the maximum number of CCs, and transmits the data, including the buffered data, as quickly as possible by using all available radio resources.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1A:
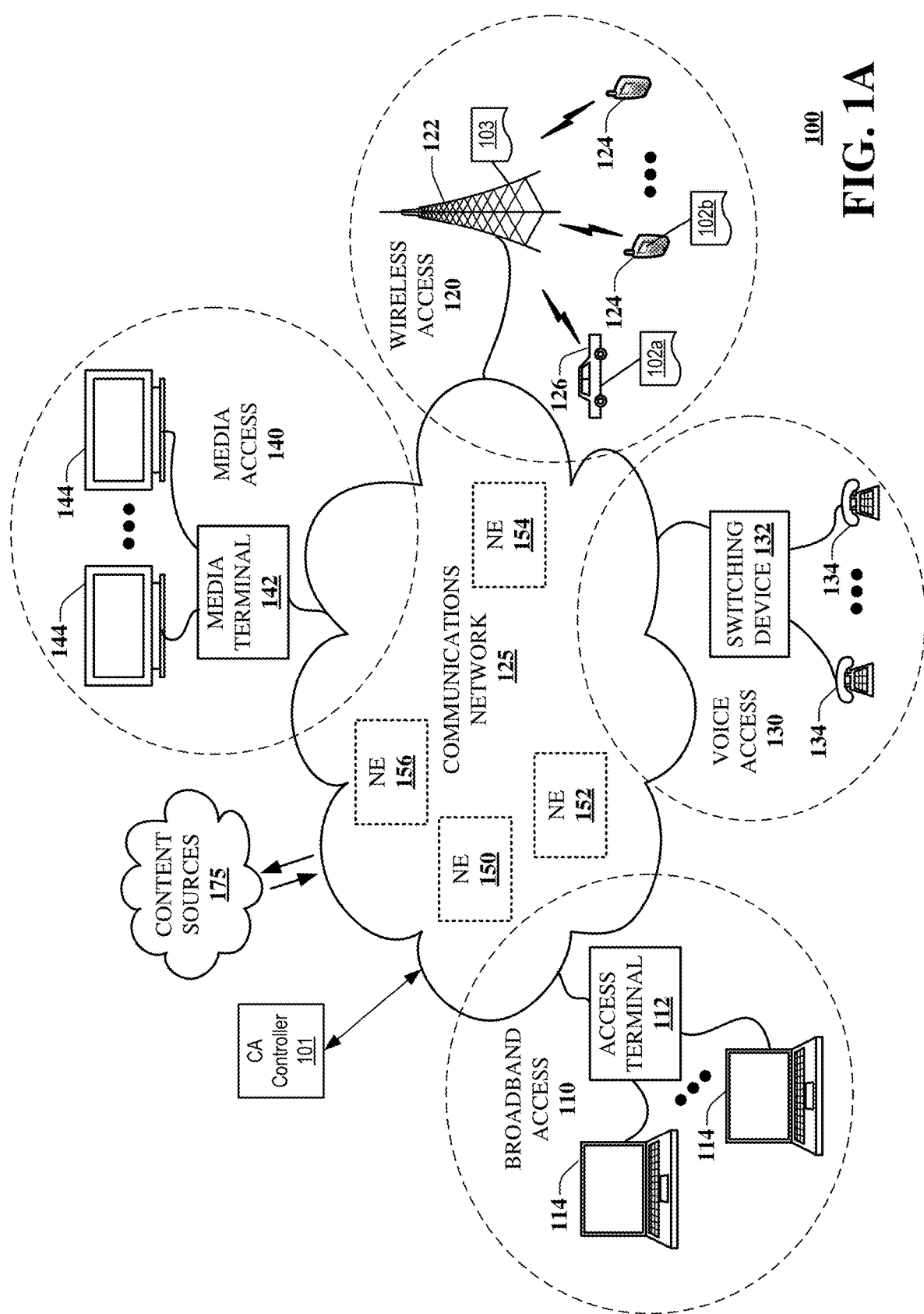
FIG. 1A is a block diagram illustrating an exemplary, non-limiting embodiment of a communications network in accordance with various aspects described herein.

The subject disclosure describes, among other things, illustrative embodiments for determining a data rate of a mobile application and configuring a minimum number of component carriers to participate in carrier aggregation of user plane data of the mobile application, without requiring that all available radio resources participate in the carrier aggregation. Other embodiments are described in the subject disclosure.

One or more aspects of the subject disclosure include a process that includes identifying, by a processing system including a processor of a mobile device, a maximum number of radio resources of the mobile device, detecting, by the processing system, activity of a mobile application of the mobile device, and determining, by the processing system, a data rate requirement of the mobile application. The data rate requirement is compared, by the processing system, to a primary component capacity of a primary component carrier. Responsive to the data rate requirement exceeding the primary component capacity, a number of secondary component carriers are identified, by the processing system and according to the data rate requirement of the mobile application. The number of secondary component carriers provide a number of secondary component capacities, wherein a combination of the primary component capacity and the number of secondary component capacities is not less than the data rate requirement of the mobile application. A number of the of radio resources are configured, by the processing system, according to the number of secondary component carriers to obtain a number of configured radio resources, wherein the number of radio resources does not exceed the maximum number of the plurality of radio resources, and wherein the data rate requirement of the mobile application is accommodated by the combination of the primary component capacity and the number of secondary component capacities.

One or more aspects of the subject disclosure include a device, having a processing system including a processor and a memory that stores executable instructions. The instructions, when executed by the processing system, facilitate performance of operations. The operations include identifying a maximum number of radio resources of a mobile device, detecting activity of an application, and determining a data throughput requirement of the application. The data throughput requirement is compared to a first data throughput capacity of a first component carrier. Responsive to the data throughput requirement exceeding the first data throughput capacity, a number of secondary component carriers are determined according to the data throughput requirement of the application. The number of secondary component carriers provide a number of secondary data throughput capacities, wherein a combination of the first data throughput capacity and the number of secondary data throughput capacities is not less than the data throughput requirement of the application. A number of the radio resources are configured according to the number of secondary component carriers to obtain a number of configured radio resources, wherein the number of configured radio resources does not exceed the maximum number of the plurality of radio resources, and wherein the data throughput requirement is accommodated by the combination of the first data throughput capacity and the number of secondary data throughput capacities.

One or more aspects of the subject disclosure include a non-transitory, machine-readable medium, including executable instructions that, when executed by a processing system including a processor, facilitate performance of operations. The operations include identifying a number of radio resources provided within a mobile device, detecting activity of an application, and determining a data communication requirement of the application. The data communication requirement is compared to a first communication capacity of a first component carrier. Responsive to the data communication requirement exceeding the first communication capacity, a number of secondary component carriers is identified according to the data communication requirement, the secondary component carriers providing a number of secondary communication capacities. A combination of the first communication capacity and the number of secondary communication capacities is not less than the data communication requirement. A group of the radio resources is configured according to the number of secondary component carriers to obtain a number of configured radio resources, wherein a number of the group of the radio resources does not exceed the number of the radio resources, and wherein the data communication requirement is accommodated by the combination of the first communication capacity and the number of secondary communication capacities.

A data throughput study was conducted in which it was determined that most wireless users do not need the high speed offered by 4CC or above. Results of this study are provided in a table below, suggesting that a 4 Mbps throughput speed is acceptable for 90% of mobile applications, or apps, while 10 Mbps provides an acceptable, good or so-called "happy" experience for almost all apps.

Table 1. Application Data Speeds.

| Ref. No. | Task | 90% Acceptable Threshold (Mbps) | 90% Good/ Happy Target (Mbps) | 90% Very Good/ Exceptional (Mbps) |
|---|---|---|---|---|
| 1 | Graphical Email | 1.9 | 4.3 | 7.2 |
| 2 | Texting - send a pic (Upload) | 0.9 | 3.7 | 7.3 |
| 3 | Web browsing | 1.9 | 10.4 | 37 |
| 4 | YouTube ® video streaming | 3.0 | 4.0 | 26.5 |
| 5 | Netflix ® video streaming | 0.9 | 3.1 | 31.0 |
| 6 | DirecTV ® video streaming | 1.9 | 3.4 | N/A |
| 7 | Facebook ® social media browse | 0.9 | 5.6 | 27.2 |
| 8 | Pandora ® streaming audio | 1.0 | 3.6 | 11.5 |
| 9 | Download Multiple Pics in Email | 5.2 | 7.2 | 24.0 |
|   | Recommended Target: | 4 Mbps | 10 Mbps | 30 Mbps |

Unfortunately, whenever an additional carrier is activated, a spectrum efficiency will suffer some degradation associated with the overhead of activating and/or deactivating the SCCs. It has been observed that a data buffer size may be up to ten times (10×) a maximal speed of corresponding user traffic. Additionally, the corresponding user traffic may be random, e.g., occurring in bursts, such that there may not always be enough data in the data buffer to take full use of maximum SCC activations. Such scenarios would result in a constant de-activation and reactivation of SCells (Secondary cells). Surprisingly, the degradation due to radio link control (RLC) flow control due to assembling and re-assembling the SCCs may be as high as 10%-20%. Even more surprising is that the spectrum efficiency degradation would be encountered even if the application required a low throughput.

Current network designs that employ CA in an all or nothing scenario do not take into consideration such bandwidth inefficiencies and/or UE power consumption. A UE that has to keep maximum CCs active during CA will necessarily have all of the radio resources, e.g., radio receivers, energized and active to receive data, even though there may be no data to transmit. By way of analogy, each CC is like cylinder in the engine. Thus, a 5CC configuration may be viewed as an engine having five cylinders. Just as a modern-era automobile may shut off some of the cylinders when they are not needed, a UE may be adapted such that not all 5CCs are activated if there is a relatively small amount of data from the app. Each carrier may support up to four data streams, e.g., via a 4×4 multiple-input-multiple-output (MIMO) scenario, the UE may have twenty data streams to wait for when receiving the data when SCCA is activated. From the aforementioned throughput study, an app requiring 4 Mbps acceptable speed from the UE does not need 5CCs, e.g., the car does not require all five cylinders, to be working at the same time. Most of the time the app requires no more than a single CC, e.g., 1 cylinder, or at most 3 cylinders/CCs. A network designed to maximize CA activation key performance indicators (KPIs) may waste precious radio resources and drain UE battery for little or no benefit.

Generally speaking, each carrier component (CC) may have multiple radio resources, e.g., four radio receivers for middle-bands (B2/B66/B30/B29 . . . ) for MIMO 4×4 operation, and two radio receivers for low-band (B5/B12/B14 . . . ) for MIMO 2×2 operation. If using 5CC, a maximum radio receiver bandwidth could be 40 if all CC with MIMO 4×4. A lesser the number of CCs that are activated, the lesser is the number of radio receivers that would be activated, e.g., powered on and ready to receive signals. Such reductions in the numbers of activated radio resources, e.g., receivers, in CA mode, will transfer into savings in UE resources, such as battery, buffer allocations, related processing of overhead signaling, e.g., CQI measurement and reporting, and so on. Moreover, any reduction in the number of active receivers from a maximum to a lesser, appropriate number for a given application, would also reduce a possibility of interference between CCs. As will be shown and describe below in relation to FIG. 2D, a percentage of saving is shown according to reductions in numbers of radio receivers active and/or otherwise allocated during CA operations.

This disclosure proposes a system and/or method for a user self-adaptive intelligent CA that, in at least some embodiments, may be employed in combination with network slicing. According to the user self-adaptive intelligent CA, the CA configuration may include a custom number of CCs depending on data requirements of the app. Thus, a number of CCs corresponding to a number of active radio resources may be driven by the APP speed and, in at least some embodiments, combined with 5G network slicing that promotes a more efficient implementation of CA scenarios. Because spectrum and UE battery both are finite resources that are extremely difficult to extend, the technical and economic benefits of this disclosure and the exemplary embodiments described herein can be tremendous.

Referring now to FIG. 1A, a block diagram is shown illustrating an example, non-limiting embodiment of a system 100 in accordance with various aspects described herein. For example, system 100 can facilitate in whole or in part determining a data rate of a mobile application and configuring a minimum number of component carriers to participate in carrier aggregation of user plane data of the mobile application, without requiring that all available radio resources participate in the carrier aggregation. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the system 100 may include a carrier aggregation (CA) controller 101. The CA controller 101 may be in communication with one or more access networks, e.g., in communication with the wireless access 120 network via the communications network 125. The CA controller 101 may be adapted to implement one or more of the CA features disclosed herein and otherwise be adapted to configure CA radio resources according to application and/or user requirements, without necessarily utilizing all available radio resources as is currently the case under a maximum bandwidth utilization principle.

By way of example, a wireless access terminal of the access point 122 may include equipment and/or functionality 103 adapted to monitor application usage, to determine corresponding data rates, and to identify number(s) of component carriers (CCs) of a CA scenario based on one or more of the application, the corresponding data rate and/or available carriers of the access point 122. Alternatively or in addition, one or more of the mobile device 124 or vehicle 126 may include equipment and/or functionality 102a, 102b adapted to monitor application usage, to determine corresponding data rates, and to identify number(s) of component carriers (CCs) of a CA scenario based on one or more of the application, the corresponding data rate, available radio resources of the mobile device 124 or vehicle 126 and/or available carriers of the access point 122. One or more of the example access point functionality 103, the mobile device functionality 102a, or the vehicle functionality 102b may operate independently and/or in cooperation with the CA controller 101 to implement the tailored CA functionality disclosed hereon.

Figure 1B:
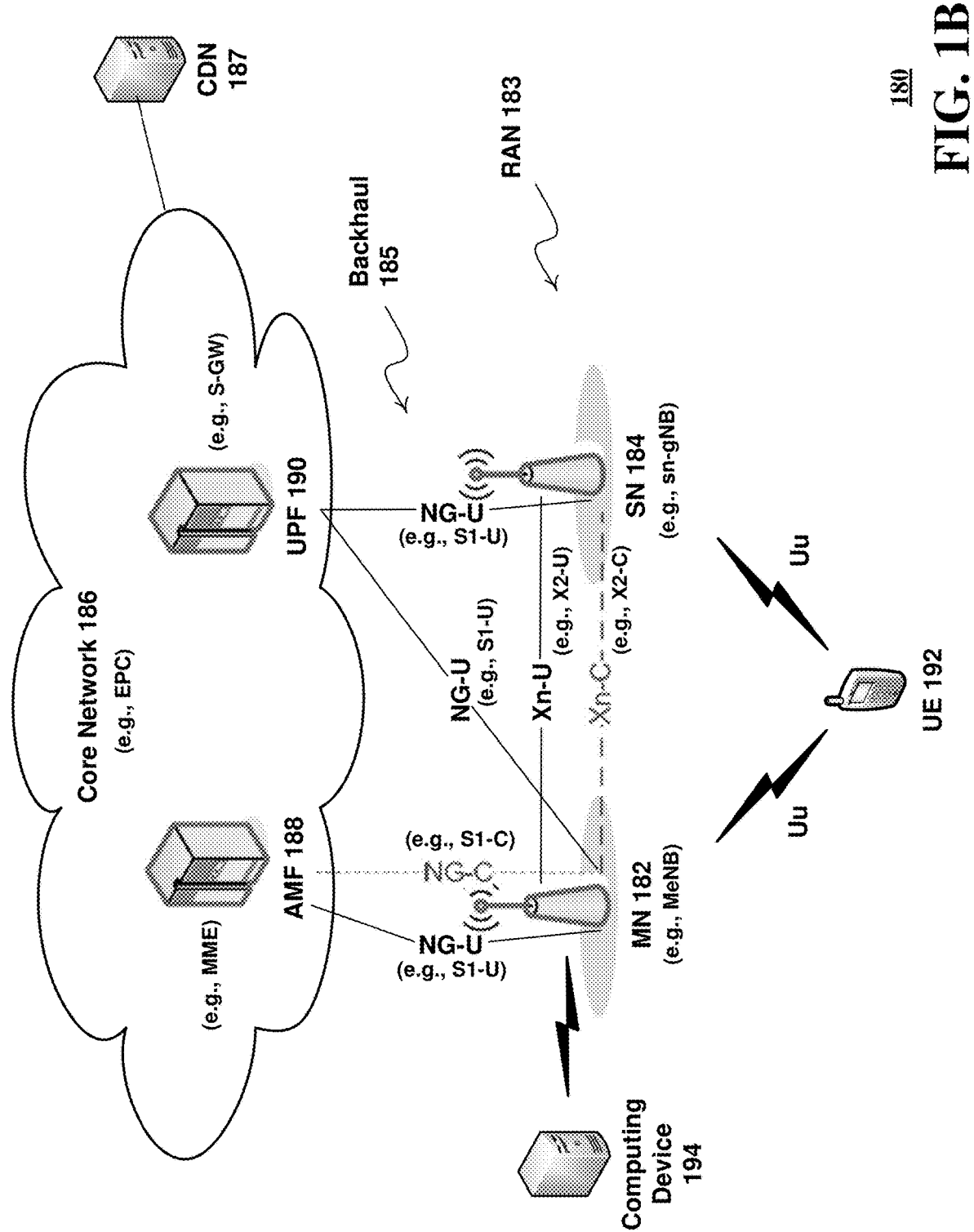
FIG. 1B is a block diagram illustrating an example non-limiting embodiment of a communication network (or system) functioning within or in conjunction with the system of FIG. 1A.

Referring now to FIG. 1B, a block diagram is shown illustrating an example non-limiting embodiment of a communication network (or system) 180 functioning within or in conjunction with the system 100 of FIG. 1A in accordance with various aspects described herein. The communication network 180 can be configured to provide Multi-Radio Dual Connectivity (MR-DC) via a radio access network (RAN) 183 that includes one or more network nodes (e.g., access points, such as base stations or the like). In one example, RAN 183 can include a master node (MN) 182 and a secondary node (SN) 184. In one example, each of MN 182 and SN 184 can employ a different radio access technology (RAT). A user equipment (UE) 192 can be equipped with multiple transmitter (Tx) devices and/or multiple receiver (Rx) devices configured to communicate with, and utilize network resources provided via, the MN 182 and the SN 184. The MN 182 and/or the SN 184 can be operated with shared spectrum channel access.

One or more of the nodes 182, 184 of the RAN 183 can be in communication with a mobility core network 186 via a backhaul network 185. The core network 186 can be in further communication with one or more other networks (e.g., one or more content delivery networks (one of which, CDN 187 is shown)), one or more services and/or one or more devices. The core network 186 can include various network devices and/or systems that provide a variety of functions, such as mobility management, session management, data management, user plane and/or control plane function(s), policy control function(s), and/or the like. As shown in FIG. 1B, the core network 186 can include an Access Mobility and Management Function (AMF) 188 configured to facilitate mobility management in a control plane of the communication network 180, and a User Plane Function (UPF) 190 configured to provide access to a data network, such as a packet data network (PDN), in a user (or data) plane of the communication network 180. The AMF 188 and the UPF 190 can each be implemented in one or more computing devices (e.g., one or more server devices or the like). In some embodiments, the core network 186 can additionally, or alternatively, include one or more devices implementing other functions, such as a master user database server device for network access management, a PDN gateway server device for facilitating access to a PDN, a Unified Data Management (UDM) function, a Session Management Function (SMF), a Policy Control Function (PCF), and/or the like.

The MN 182 and the SN 184 can be communicatively coupled to one another via an Xn-C interface configured to facilitate control plane traffic between the MN 182 and the SN 184 and can also be communicatively coupled to one another via an Xn-U interface configured to facilitate user plane traffic between the MN 182 and the SN 184.

The AMF 188 can be communicatively coupled to the MN 182 via an NG-C interface in the control plane. In some embodiments, the AMF 188 can additionally, or alternatively, be communicatively coupled to the SN 184 via a similar interface in the control plane. The UPF 190 can be communicatively coupled to the MN 182 via an NG-U interface in the user plane and can be communicatively coupled to the SN 184 via a similar NG-U interface in the user plane.

Each of the MN 182 and the SN 184 can include a radio resource control (RRC) entity capable of exchanging network traffic (e.g., protocol data units (PDUs)) with the UE 192. In some embodiments, the UE 192 can communicate with the MN 182 via a Uu radio interface in an RRC protocol layer of the control plane. In some embodiments, the UE 192 can have a single RRC state, such as a single control plane connection with the core network 186 based on the RRC entity of the MN 182. In some embodiments, the MN 182 can facilitate control plane communications between the SN 184 and the UE 192 by, for example, transporting RRC PDUs, originating from the SN 184 to the UE 192.

The communication network 180 can provide multiple bearer types in the data plane. For example, the bearer types can include a Master Cell Group (MCG) bearer type, a Secondary Cell Group (SCG) bearer type, and a split bearer type. Depending on the RATs employed by the MN 182 and the SN 184, various packet data convergence protocol (PDCP) configurations can be implemented for the different bearer types. Thus, in various embodiments, each bearer type (e.g., the MCG bearer type, the SCG bearer type, and the split bearer type) can be terminated either in the MN 182 or in the SN 184.

In some embodiments, the communication network 180 can be configured to provide dual connectivity according to an E-UTRAN New Radio (NR) Dual Connectivity (EN-DC) configuration. In some embodiments, the EN-DC configuration can provide a 5G Non-Standalone (NSA) implementation. In one example (related to a 5G NSA implementation), an LTE radio and the core network 186 can be utilized as an anchor for mobility management and coverage for an additional 5G (or NR) carrier. Network traffic can be split in a variety of manners, such as across LTE and NR at an eNodeB, at the core network 186, and/or at an NR cell.

In embodiments in which the communication network 180 is configured to provide the EN-DC configuration, the MN 182 can include a master eNodeB (MeNB) that provides E-UTRAN access, and the SN 184 can include a second gNodeB sn-gNodeB (sn-gNB) that provides NR access. The core network 186 can be (or can include) an evolved packet core (EPC), where the AMF 188 is implemented as a mobility management entity (MME) and the UPF 190 is implemented as a serving gateway (SGW). The core network 186 can include one or more devices that implement one or more functions, such as a Home Subscriber Server (HSS) for managing user access, a PDN gateway server device for facilitating access to a PDN, and/or the like.

In an EN-DC configuration, the MN (MeNB) 182 and the SN (sn-gNB) 184 can be communicatively coupled to one another via an X2-C interface in the control plane, and via an X2-U interface in the user plane. The AMF (MME) 188 can be communicatively coupled to the MN (MeNB) 182 via an S1-MME interface in the control plane. In some embodiments, the AMF (MME) 188 can additionally, or alternatively, be communicatively coupled to the SN (sn-gNB) 184 via a similar interface in the control plane. The UPF (SGW) 190 can be communicatively coupled to the MN (MeNB) 182 via an S1-U interface in the user plane and can also be communicatively coupled to the SN (sn-gNB) 184 via a similar S1-U interface in the user plane, to facilitate data transfer for the UE 192.

In the EN-DC configuration, the MeNB can include an E-UTRA version of an RRC entity and the sn-gNB can include an NR version of an RRC entity. Additionally, in the EN-DC configuration, an E-UTRA PDCP or an NR PDCP can be configured for MeNB terminated MCG bearer types, and an NR PDCP can be configured for all other bearer types.

In some embodiments of the EN-DC configuration, the AMF (MME) 188 can communicate exclusively with the MN (MeNB) 182, but both the MeNB and the en-gNB can access the core network (e.g., EPC) 186. In various embodiments, data traffic can be split between the LTE and NR RATs 182, 184, but where the MN (MeNB) 182 maintains sole control of the dual connectivity mode of the communication network 180. The UE 192 can access the core network (e.g., EPC) 186 by establishing a connection with the MN (MeNB) 182. If the UE 192 supports EN-DC and is capable of communicating in the NR band (e.g., if the UE 192 includes an LTE communication unit, such as an LTE Rx/Tx radio and protocol stack, and an NR communication unit, such as an NR Rx/Tx radio and protocol stack), the MN (MeNB) 182 can instruct the UE 192 to obtain measurements of, and provide measurement report(s) on, the NR band. In a case where the UE 192 identifies a candidate network node in the NR band, such as the SN (sn-gNB) 184, the MN (MeNB) 182 can communicate one or more parameters to the en-gNB (e.g., via the X2-C interface) to enable the sn-gNB to establish a connection with the UE 192. Upon establishing such a connection, the MN (MeNB) 182 can then forward a portion of any incoming user data, directed for the UE 192, to the SN (sn-gNB) 184 for transmission to the UE 192, thereby enabling the UE 192 to simultaneously communicate over LTE and NR to achieve increased data rates. In some embodiments, the MN (MeNB) 182 can request, or otherwise, instruct, the UPF (SGW) 190 to exchange user data directly with the SN (en-gNB) 184. In such embodiments, the sn-gNB can similarly forward a portion of any incoming user data, directed for the UE 192, to the MeNB for transmission to the UE 192.

As shown in FIG. 1B, the communication network 180 can include a computing device 194 communicatively coupled with the MN 182. The computing device 194 can include one or more devices, such as server device(s), configured to provide one or more functions or capabilities, such as dual connectivity control functions, edge computing functions and/or capabilities, provisioning of data and/or services for user equipment (e.g., such as UE 192), data analytics function(s), machine learning and/or artificial intelligence function(s) that provide resource management capabilities (e.g., mobility management, admission control, interference management, etc.), automatic planning functions, configuration functions, optimization functions, diagnostic functions, healing functions, and/or the like. For example, in some implementations, the computing device 194 can include, or be implemented in, a multi-access edge computing (MEC) device or device(s), a RAN Intelligent Controller (RIC), a Self-Organizing Network (SON), and/or the like. In some embodiments, such as in a case where the core network 186 includes an EPC, the computing device 194 can include, or be implemented in, an MME, an SGW, and/or the like.

It is to be understood and appreciated that the quantity and arrangement of nodes, devices, and networks shown in FIG. 1B are provided as an example. In practice, there may be additional nodes, devices, and/or networks, fewer nodes, devices, and/or networks, different nodes, devices, and/or networks, or differently arranged nodes, devices, and/or networks than those shown in FIG. 1B. For example, the communication network 180 can include more or fewer MNs 182, SNs 184, AMF device(s) 188, UPF device(s) 190, UE's 192, computing devices 194, core networks 186, etc. Furthermore, two or more nodes or devices shown in FIG. 1B may be implemented within a single node or device, or a single node or device shown in FIG. 1B may be implemented as multiple, distributed nodes or devices. Additionally, or alternatively, a set of nodes or devices (e.g., one or more nodes or devices) of the communication network 180 may perform one or more functions described as being performed by another set of nodes or devices of the communication network 180.

In at least some embodiments, CA may be combined with dual carrier in order to serve a common application of one UE 192 with multiple component carriers (CCs) of a CA session. To this end, it is understood that one or more of the UE 192, the MN 182 and/or the SN 184 may be adapted according to the techniques disclosed herein to identify a number of CCs for CA operation according to an application requirement alone or in combination with another requirement and without necessarily making the selecting based on a maximum number of radio resources available on the UE 192.

While CA may increase the data throughput or speed, each additional carrier suffers from 10% to 20% throughput degradation. For example, consider a single carrier of 20 Mhz that may reach throughputs of up to 400 Mbps. A 2CCA with 20 Mhz total bandwidth may only deliver 360 Mbps. 2CCA needs a new function at the network to split traffic between the two carriers which comes with its overhead. In summary, the current network CA configuration and activation are designed for increasing speed for a single user instead of maximizing overall cell throughput.

Figure 2A:
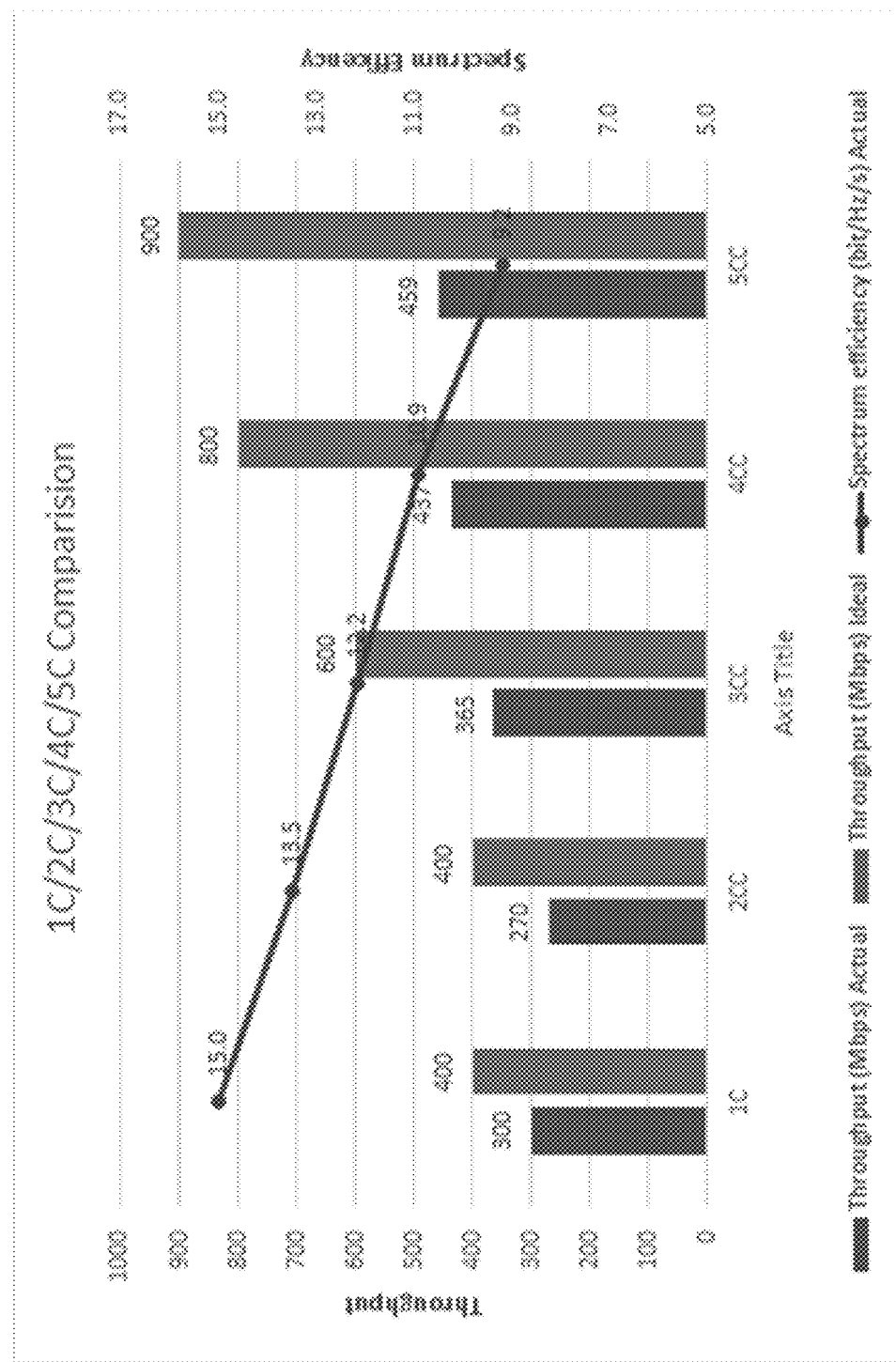
FIG. 2A is a graph illustrating a comparison of carrier aggregation performance according to different numbers of component carriers.

FIG. 2A is a graph illustrating a comparison of carrier aggregation performance according to different numbers of component carriers. According to the illustrative example, a single carrier, 1C, scenario offers a total or ideal throughput of about 400 Mpbs. However, it has been observed that a more realistic or actual throughput may be limited, such that an actual observed throughput of the 1C scenario is about 300 Mbps. This corresponds to a spectrum efficiency of 15.0 bit/Hz/s. Likewise, a to carrier CA scenario, 2CC, offers a total ideal bandwidth of 400 Mbps, with an actual throughput of 270 Mbps, which corresponds to a spectrum efficiency of 13.5 bit/Hz/s. It seems counterintuitive that an actual throughput of a 2 CC scenario is less than that of a 1CC. According to the example results, the trend continues as additional CCs are added, such that for a 5CC scenario offering 900 Mbps of throughput, only 459 Mbps of actual throughput is realized, having a corresponding spectrum efficiency of 9.2 bit/Hz/s.

Table 2 provides tabulated results of a comparison of carrier aggregation performance according to different numbers of component carriers. The number of CCs is varied from 1CC to 5CC. The total bandwidth is provided in a second column and is determined as a sum of the CC bandwidths provide in a last column. The Actual throughputs in Mbps are shown beside the ideal throughput in Mbps. The actual spectrum efficiencies in bit/Hz/sec are also shown beside the ideal spectrum efficiencies in bit/Hz/sec. From the chart below, it is apparent that spectrum efficiency suffers as total bandwidth is increased according to additional CCs.

TABLE 2

Comparison of CA Performance According to CC Number

| Number of CC | Total Bandwidth | Throughput (Mbps) | | Spectrum Efficiency (bit/Hz/s) | | CC BW |
| --- | --- | --- | --- | --- | --- | --- |
| | | Actual | Ideal | Actual | Ideal | |
| 1 cc | 20 | 300 | 400 | 15.0 | 20 | 20 |
| 2 cc | 20 | 270 | 400 | 13.5 | 20 | 10 + 10 |
| 3 cc | 30 | 365 | 600 | 12.2 | 20 | 10 + 10 + 10 |
| 4 cc | 40 | 437 | 800 | 10.9 | 20 | 10 + 10 + 10 + 10 |
| 5 cc | 50 | 459 | 900 | 9.2 | 18 | 10* + 10 + 10 + 10 + 10 |

Figure 2B:
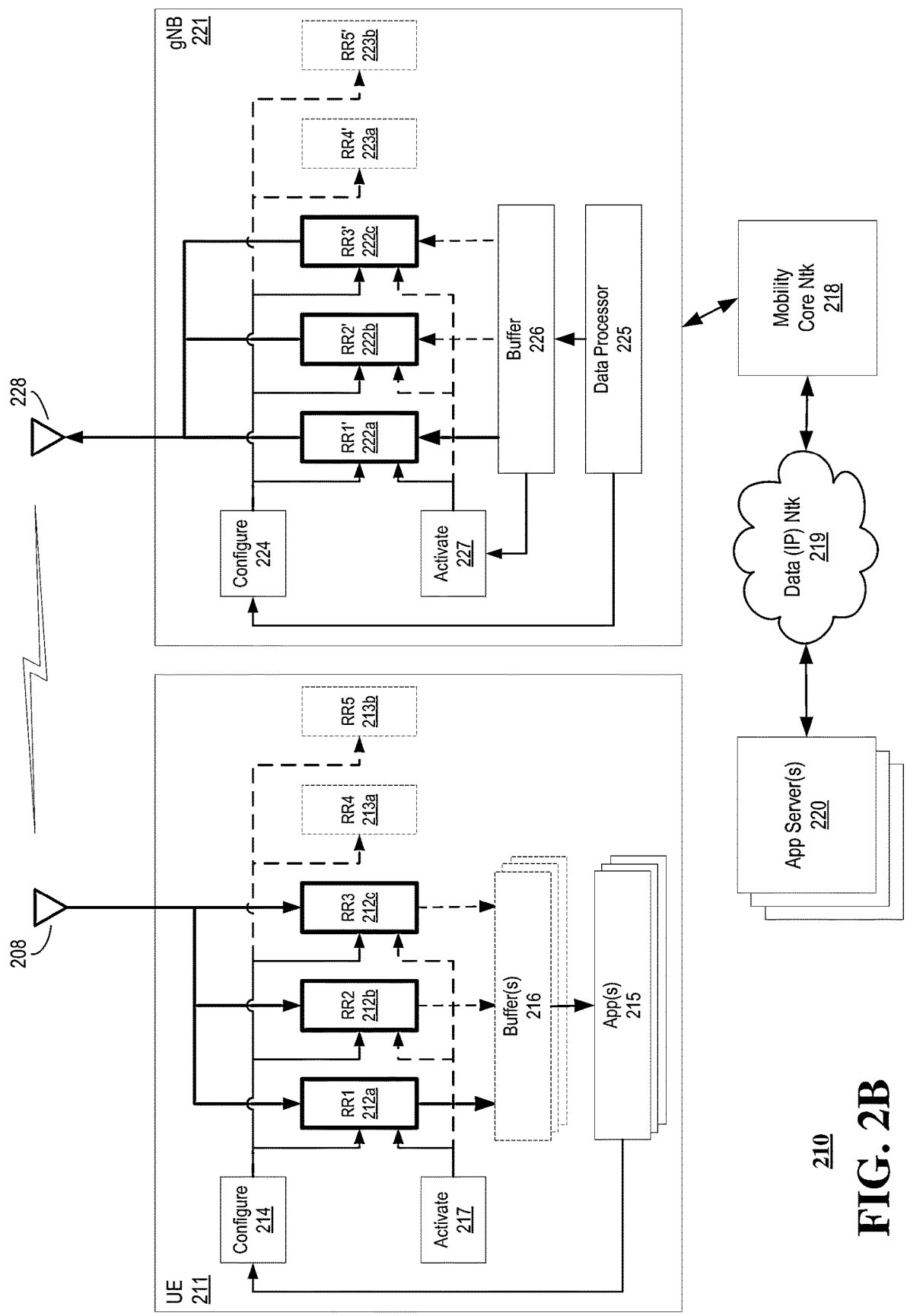
FIG. 2B is a block diagram illustrating an example, non-limiting embodiment of a carrier aggregation system functioning within the communication network of FIGS. 1A and 1B, in accordance with various aspects described herein.

FIG. 2B is a block diagram illustrating an example, non-limiting embodiment of a carrier aggregation system 210 functioning within the communication network of FIGS. 1A and 1B, in accordance with various aspects described herein. The example CA system 210 includes a mobile device, e.g., user equipment 211, in wireless communication with a radio access terminal, e.g., gNB 221. The UE 211 and the gNB 221 may be configured to implement one or more wireless mobility protocols, including any of the example protocols disclosed herein. Without limitation these protocols may include 3GPP protocols, such as LTE, LTE-Advanced, 4G, 5G, and the like. In particular, the protocols may be adapted to implement carrier aggregation, in which multiple carriers, e.g., multiple segments of licensed RF spectrum, are aggregated to support data communications of a single mobile application. The UE 211 may include any wireless device adapted for wireless communications, including, without limitation, mobile phones, smartphones, tablet devices, laptop devices, vehicles, drones, and more generally, any smart devices, including devices adapted for machine-to-machine communications, e.g., according to Internet of Things scenarios. The gNB 221 is shown for illustrative purposes, and may be more generally considered as a wireless access node, such as an eNB, that includes one or more radio resources adapted for wireless communication with one or more UEs 211. The wireless communications may be managed according to one or more protocols, such as the aforementioned 3GPP protocols to support an attachment process in which UEs 211 within wireless coverage area may be identified and managed according to an air interface. Management may include, without limitation, establishing one or more data sessions, e.g., in which the UE 211 may communicate with an application server via the air interface.

The example UE 211 may include a maximum number of available radio resources, e.g., five UE radio resources RR1-RR5 that may be in communication between a mobile application, or app, 215 and an antenna 208. Although a single antenna 208 is shown, it is understood that more than one antenna may be provided, such that some of the radio resources may be connected to one antenna and other radio resources may be connected to another. In at least some embodiments, the UE 211 may include a data buffer 216 (shown in phantom). The data buffer 216 may be in communication between the app 215 and the UE radio resources RR1-RR5.

According to the illustrative example, the UE 211 includes a configuration module 214 in communication with one or more of the UE radio resources RR1-RR5. The configuration module 214 may be in further communication with one or more of the apps 215, such that the configuration module 214 may detect activation and/or usage of an app 215. Alternatively or in addition, the configuration module 214 may be adapted to detect and/or otherwise identify a type of app that has been activated and/or otherwise in usage. An identification of a type of app 215 may include an application category, e.g., streaming media. Alternatively or in addition, the identification of the type of app 215 may be more specific, possibly identifying the app 215, such that usage of a Netflix® streaming media app 215 may be distinguished from a usage of an HBO® streaming media app 215.

In operation, the configuration module 214 may determine a communication requirement of the app 215, such as a data throughput and/or data rate of the app and/or the type of app. Responsive to a determination of such a requirement, the configuration module 214 may identify a corresponding number of CCs to participate in a CA data session. Identification of the corresponding number of CCs may be straightforward, e.g., using a lookup table or the like to map a data rate or throughput to a number of CCs. Alternatively or in addition, the configuration module 214 may apply more sophisticated algorithm(s) that identifies a corresponding number of CCs in a minimal sense, such that a minimum number of CCs are configured in order to maximize bandwidth utilization, and to preserve power consumption and/or minimize interference, e.g., intermodulation distortion, that may result when additional CCs are used.

By way of nonlimiting example, the configuration module 214 determines that three CCs are appropriate according to data throughput requirements of the app 215. The configuration module 214 provides a configuration signal to three of the five available radio resources, e.g., a first configured UE radio resource (RR1) 212a, a second configured UE radio resource (RR2) 212b and a third configured UE radio resource (RR3) 212c, generally configured UE radio resources 212. According to this example, the five UE radio resources include a fourth unconfigured UE radio resource (RR4) 213a and fifth unconfigured UE radio resource (RR5) 213b, generally unconfigured UE radio resources 213. Configuration may indicate that the configured UE radio resources 212 are available to participate in a CA session for data communications involving the app 215. Consequently, the unconfigured UE radio resources 213 may not be available to participate in the same CA session. Their participation may be unnecessary, as the configuration module 214 has determined that three CCs as being sufficient for a CA session involving the particular app 215.

Without limitation, the UE radio resources RR1-RR5 may include transmitters as may be used for uplink communications from the UE 211 to the network, e.g., to the gNB 221. Alternatively or in addition, the UE radio resources RR1-RR5 may include receivers as may be used for downlink communications from the network, e.g., from the gNB 221 to the UE 211. At least some of the UE radio resources RR1-RR5 may include transceivers. In at least some embodiments, the UE 211 may include one or more data buffers 216 (shown in phantom). For example, the data buffers 216 may be used to buffer uplink data.

The example gNB 221 may include a maximum number of available radio resources, e.g., five gNB radio receivers RR1'-RR5' that may be in communication between a data processor 225 and an antenna 228. Once again, although a single antenna 228 is shown, it is understood that more than one antenna may be provided, such that some of the gNB radio resources may be connected to one antenna and other radio resources may be connected to another. In at least some embodiments, the gNB 221 may include a data buffer 226. The data buffer 226 may be in communication between the data processor 225 and the gNB radio resources RR1'-RR5'.

According to the illustrative example, the gNB 221 includes a configuration module 224 in communication with one or more of the gNB radio resources RR1'-RR5'. The configuration module 224 may be in further communication with the data processor 225, such that the configuration module 224 may detect activation and/or usage of an app 215 by the UE 211. Alternatively or in addition, the configuration module 224 may be adapted to detect and/or otherwise identify a type of app that has been activated and/or otherwise in usage. An identification of a type of app 215 may include an application category, e.g., streaming media and/or a particular app, e.g., a Netflix® streaming media app 215 versus an HBO® streaming media app 215.

In operation, the configuration module 224 may determine a communication requirement of the app 215, such as a data throughput and/or data rate of the app and/or the type of app. Responsive to a determination of such a requirement, the configuration module 224 may identify a corresponding number of CCs to participate in a CA data session. Identification of the corresponding number of CCs may be straightforward, e.g., using a lookup table or the like to map a data rate or throughput to a number of CCs. Alternatively or in addition, the configuration module 224 may apply more sophisticated algorithm that identifies a corresponding number of CCs in a minimal sense, such that a minimum number of CCs are configured in order to maximize bandwidth utilization, and to preserve power consumption and/or minimize interference, e.g., intermodulation distortion, that may result when additional CCs are used.

By way of nonlimiting example, the configuration module 224 determines that three CCs are appropriate according to data throughput requirements of the app 215. The configuration module 224 provides a configuration signal to three of the five available radio resources, e.g., a first configured gNB radio resource (RR1') 222a, a second configured gNB radio resource (RR2') 222b and a third configured gNB radio resource (RR3') 222c, generally configured gNB radio resources 222. According to this example, the five gNB radio resources include a fourth unconfigured gNB radio resource (RR4') 223a and fifth unconfigured gNB radio resource (RR5') 223b, generally unconfigured gNB radio resources 223. Configuration may indicate that the configured gNB radio resources 222 are available to participate in a CA session for data communications involving the app 215. Consequently, the unconfigured gNB radio resources 223 may not be available to participate in the same CA session. Their participation may be unnecessary, as the configuration module 224 has determined that three CCs as being sufficient for a CA session involving the particular app 215.

Without limitation, the gNB radio resources RR1'-RR5' may include transmitters as may be used for downlink communications from the network or gNB 221 to the UE 211. Alternatively or in addition, the gNB radio resources RR1'-RR5' may include receivers as may be used for uplink communications from the UE 211 to the network, e.g., to the gNB 221. More generally, the gNB radio resources may include any combination of receivers, transmitters and/or transceivers. In at least some embodiments, the gNB 221 may include one or more data buffers 226. For example, the data buffers 226 may be used to buffer downlink data.

According to the illustrative example, the gNB 221 may be in further communication with a mobile core network 218 adapted to manage such mobile network features as attachment of the UE 211, mobility, and the like. The mobility network core 218 may be in further communication with one or more application servers 220, e.g., one or more other data or IP networks, such as the Internet 219. Thus, app information obtained via uplink data packets received from the UE 211 via the gNB 221 may be provided to a corresponding app server 220 via the mobility network core 218 and the Internet. Alternatively or in addition, app information obtained by the gNB 221 from the app server 220 via the Internet 219 and the mobility network core 218 may be provided to the UE 211.

In at least some embodiments, the configured radio resources, e.g., the configured UE radio resources 212 and/or the configured gNB radio resources 222 may be activated automatically upon configuration. Activation may indicate that the radio resources participate in data communications of an associated application. For example, when multiple ratios are activated, CA may be active according to a number of CCs determined by one or more of the configuration module(s) 214, 224, such that data communications are shared among the multiple active radio resources. Such an always active CA may eliminate overhead associated with activating the additional CCs. It should be understood that any of the CA sessions, radio resources and/or radio links disclosed herein may be participating in downlink only communications, i.e., from the gNB 221 to the UE 211, participating in uplink only communications, i.e., from the UE 211 to the gNB 221, and/or participating in downlink and uplink communications between the UE 211 and the gNB 221.

Alternatively or in addition, one of the configured UE radio resources, e.g., a first configured radio resource 212a, may be active, while the other configured radio resources 212b, 212c are not active. For example, the first configured radio resource 212a may be referred to as a primary component carrier (PCC), actively communicating with the gNB 221, e.g., to facilitate attachment processes, mobility processes, and the like. With respect to data communications of one of the apps 215, the active UE radio resource 212a may handle all of the communications during any particular period of time. Under a CA scenario, when the single UE radio resource 212a may not be sufficient to accommodate a data rate or throughput of the app 215, one or more of the other pre-configured radio resources 212b, 212c may be activated. Once activated, the one or more other active, pre-configured radio resources 212b, 212c may be referred to as secondary component carriers (SCC). The PCC and SCC share data communications during a CA operational period, such that a data rate or throughput required by the app 215 may be accommodated jointly by the PCC and the SCC.

Activation of the other pre-configured radio resources 212b, 212c may be initiated by an activation module 217. The illustrative example includes an activation module 217 in communication with each of the UE radio resources 212, 213. In at least some embodiments, the activation module 217 is in further communication with one or more data buffers 216. The data buffers 216 may facilitate a buffering of data communications as may be required from time to time, e.g., when application data is generated and/or received at a rate greater than may be communicated over one or more of the active PCCs and/or SCCs. The data buffers 216 may fill during such periods of insufficient capacity, while data buffered within the data buffers 216 may be communicated from the buffer(s)216 when available capacities of the active PCCs and/or SCCs permits.

For example, the activation module 217 may monitor a buffer level of a data buffer 216 allocated to buffer data for one of the apps 215. Under baseline conditions, a PCC supported by the first active, preconfigured radio resource 212a engages in data communications of the app 215, without any support from either of the other preconfigured radio resources 212b, 212c, or any of the other available radio resources 213. When a data rate of the app 215 exceeds a throughput capacity of the PCC, data may be buffered by one of the data buffers 216. App data and/or buffered data may be communicated via the PCC, such a buffered data level of the data buffer 216 may ebb and flow according to data activity of the app 215. The activation module 217 may be configured to activate one or more of the other pre-configured radio resources 212b, 212c, e.g., responsive to a buffered data level of the data buffer 216 exceeding a buffer threshold. Accordingly, CA operation may be engaged and/or disengaged as necessary according to activation and/or deactivation of the other pre-configured radio resources 212b, 212c. For example, when a buffered data level of the data buffer 216 returns below a buffer threshold, while CA operation engages the PCC and one or more other SCCs, one or more of the other SCCs may be disengaged.

Although activation and/or deactivation may require some level of overhead, e.g., according to an exchange of messages with the gNB 221 to coordinate activation/deactivation of the SCCs, the activity for a subset of all of the available radio resources would be less than similar activity for all of the radio resources. This is akin to an automobile engine adapted to activate/deactivate extra cylinders on-demand.

Although the aforementioned example describe activation and/or deactivation of pre-configured UE radio resources 212, it is understood that a similar process may be provided by the gNB 221. For example, the gNB 221 may include an activation module 227 that monitors buffer levels of one or more data buffers 226. The data buffers 226 may be configured to buffer data communication of one or more of the apps 215, e.g., with one data buffer 226 being allocated to one of the apps 215, while another one of the data buffers 226 may be allocated to another one of the apps 215. Such separate allocations may allow the activation module 226 to separately track buffer levels according to the different apps 215. In at least some embodiments, the gNB 221 may be configured such that a first one of the pre-configured radio resources 222a is activated to support the app 215 according to a PCC, while the other pre-configured radio resources 222b, 222c are deactivated. When a buffer level of a data buffer 226 exceeds a first activation threshold, the activation module 227 may provide an activation signal to a first one of the other pre-configured radio resources 222b that causes an activation of the radio resource 222b. The newly activated radio resource 222b shares in data communications of the app 215 according to a first SCC that together with the PCC support CA operation for the app 215. In at least some embodiments, when the buffer level drops below a first deactivation threshold, the second active radio resource 222b may be deactivated, such that data communications may be handled by the PCC alone. It is understood that a similar process may be employed in which the activation module may activate and/or deactivate another pre-configured radio resource 222c, responsive to a buffer threshold exceeding a second activation and/or deactivation threshold, as the case may be.

It is understood that in at least some embodiments, the aforementioned configurations, activations and/or deactivations may be applied on per-application bases. Accordingly, the carrier aggregation system 210 may employ CA for one active app 215, while not employing CA for another activation app 215. Likewise, the carrier aggregation system 210 may employ a first CA, e.g., having a PCC and a first number of SCCs, e.g., one SCC, adapted to support data communications of a first app 215 and another PCC and a second, different number of SCCs, e.g., two SCCs, adapted to support data communications of a second app 215. In at least some embodiments, the different CA sessions may be managed in a concurrent manner in which the different CA sessions may overlap for at least a common period of time. It is understood that in at least some embodiments, the same radio resource may be pre-configured according to one of the apps 215, while simultaneously being not pre-configured for another one of the apps 215. Likewise, it is understood that in at least some embodiments, the same pre-configured radio resource may be activated according to one of the apps 215, while simultaneously being de-activated for another one of the apps 215.

It is understood that in at least some embodiments, the number of pre-configured radio resources 212, 222 of any particular app 215 may be determined based on one or more characteristics of the particular app 215. App characteristics may include, without limitation, an app category, e.g., a media streaming app, a browsing app, an email app, and so on. For example, a media streaming app may require a first, relatively high, data throughput requirement for an acceptable user experience, e.g., requiring three preconfigured radio resources 212a, 212b, 212c according to one PCC and two SCCs. Another app, such as an email communications app may require a second, relatively low data thought requirement for an acceptable user experience, e.g., requiring one or two preconfigured radio resources 212a, 212b and/or 222a, 222b, according to a PCC alone or a PCC and one SCC. Thus, the configuration module 214 and/or 224 may identify a category of an active app 215, determine a corresponding number of PCCs and/or SCCs for the identified app category, and configure the determined number of radio resources.

Alternatively or in addition, the number of pre-configured radio resources 212, 222 of any particular app 215 may be determined based on one or more other characteristics of the particular app 215, such as an identification of the particular app, such that apps of a common category, e.g., streaming media, may require different numbers of PCCs and/or SCCs. Consider an example in which a Netflix® streaming media app may require two carrier CA, while an HBO® streaming media app may require three carrier CA. It is envisioned that in at least some embodiments, appropriate numbers of PCCs and/or SCCs may be determined to one or more of the foregoing alone or in combination with one or more other considerations. Examples of other considerations may include, without limitation, a nature of the UE, e.g., whether the app is running on a large screen, 4K device, versus a tablet or mobile phone. Other considerations may include a user preference, e.g., one user may be satisfied with a certain latency in presentation of data of one app, e.g., downloading a photo, while another user may require a lower latency using the same app. Still other factors may include user feedback, in which a particular user and/or group of users may rate their experiences with using certain apps. At least some of the ratings may be correlated to data throughput, such that corresponding appropriate numbers of CA may be determined and/or otherwise adjusted over time, e.g., according to the ratings and/or user preferences.

It is understood that acceptable data throughput requirements in some scenarios may be fixed, while in other scenarios, they may vary according to any number of considerations, e.g., including one or more of the foregoing examples, or some may be fixed, while others may vary. In at least some embodiments, the configuration modules 214, 224 may be adapted to monitor selection and/or activation of the apps 215, and to identify one or more of categories and/or particular identities of the selected/activated apps 215. Alternatively or in addition, the configuration modules 214, 224 may be adapted to identify one or more of a user or groups of users, equipment types, user preferences, user ratings, and so on, that alone or in any combination with the app identity and/or category may be used to determine an appropriate number of radio resources, which may include multiple radio resources according to CA.

In at least some embodiments, the numbers of radio resources may be determined according to a look-up function, e.g., according to one or more of the various considerations. Alternatively or in addition, the number of radio resources may be determined according to an algorithm. Algorithms may include, without limitation, statistics, e.g., averaging, max functions, min functions. Alternatively or in addition, algorithms may include interpolation and/or extrapolations. The algorithms may be applied to one or more of data throughput requirements and/or numbers of CA, e.g., numbers of PCCs and/or SCCs.

It is envisioned further, that in at least some embodiments, machine learning may be employed, e.g., in determining an appropriate number of CA radio resources for any particular app and/or category of app and/or equipment characteristics, and/or user preferences, and so on. Machine learning may include, without limitation, and application of one or more neural networks that may be trained according to sample sets, applied to current usage applications, and revised, e.g., re-trained, as necessary, e.g., according to user feedback, controlled observation, and the like.

Figure 2C:
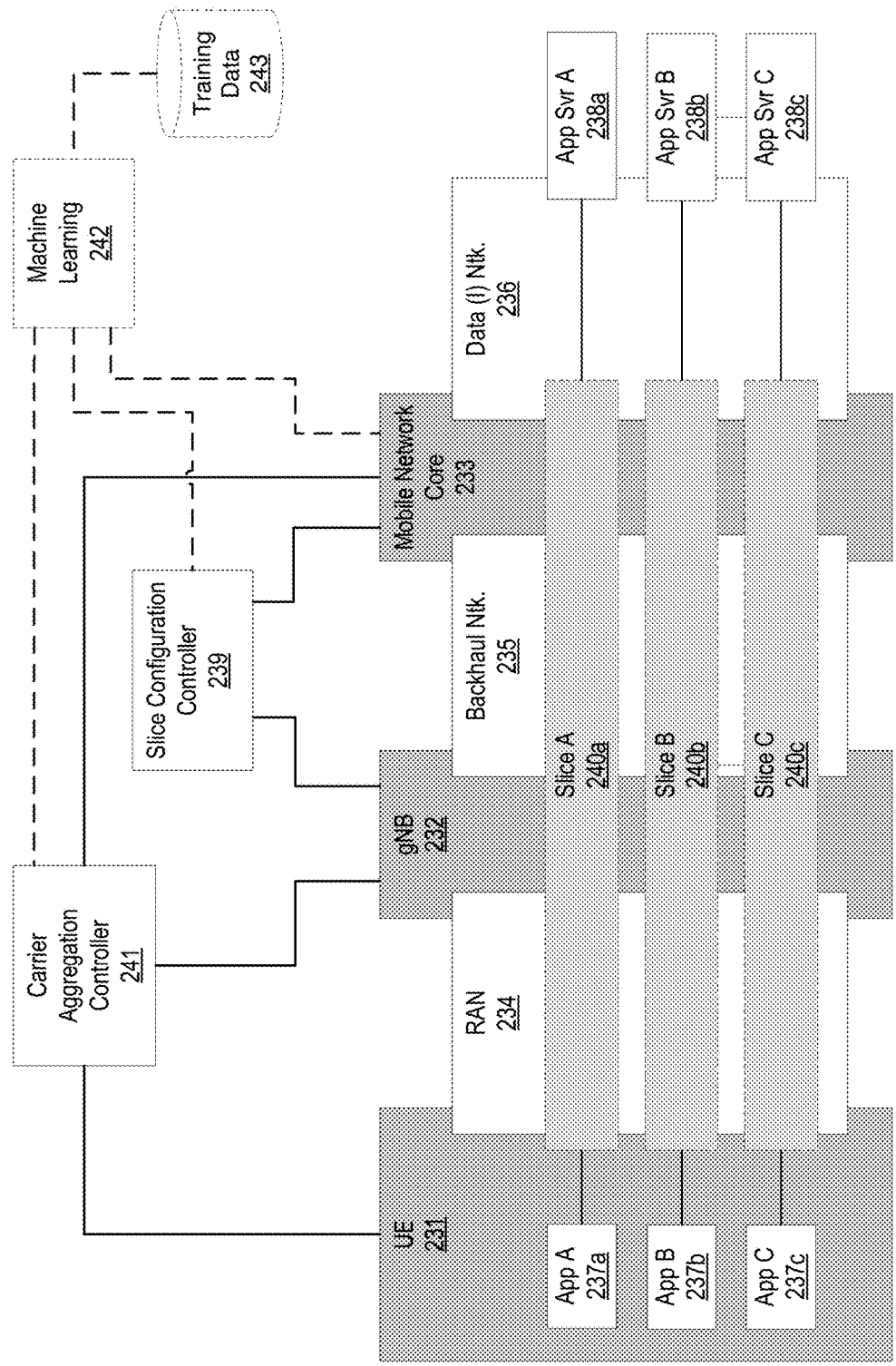
FIG. 2C is a block diagram illustrating an example non-limiting embodiment of a communication network (or system) with slicing features functioning within or in conjunction with the system of FIGS. 1A, 1B and 2B.

FIG. 2C is a block diagram illustrating an example non-limiting embodiment of a communication network (or system) with slicing features, referred to herein as a sliced network 230, functioning within or in conjunction with the system of FIGS. 1A, 1B and 2B. Network slicing may be employed in at least some scenarios, e.g., according to 5G applications. According to network slicing, different application programs of the same or different mobile devices may be serviced by different portions of a service provider's network. The different portions or slices of the network may be determined according to one or more of quality of service (QoS) requirements and/or key performance indicators (KPI) of the applications.

The example sliced network 230 includes one or more wireless access terminals, e.g., gNBs 232, and at least one mobility network core 233 that collectively service one or more UEs 231. The sliced network 230 includes a radio access network (RAN) 234 providing an air interface between the UE 231 and the gNB 232. The gNB 232, in turn, is in communication with the mobile core network 233 via one or more backhaul networks 235. The mobility network core 233, in turn, may be in communication with one or more application servers 238a, 238b, 238c, generally 238, via one or more data networks 236, e.g., including the Internet. The sliced network 230 facilitates data communications between one or more application programs or apps 237a, 237b, 237c, generally 237, and corresponding ones of the one or more application servers 238.

In particular, a first app 237a operating on the UE 231 may communication with the first application server 238a via a first network slice 240a of the sliced network 230. Likewise, second and third apps 237b, 237c may respectively communicate with the second and third application servers 238b, 238c via second and third network slices 240b, 240c of the sliced network 230. The different slices 240a, 240b, 240c, generally 240, may employ different network devices and/or network architectures that are adapted to deliver acceptable levels of service to their corresponding apps 237, e.g., according to their respective levels of QoS and/or KPI.

In at least some embodiments, the sliced network 230 includes a network slice configuration controller 239. The network slice configuration controller 239 may be in communication with one or more of the UE 231, the gNB 232 and the mobile core network. For example, the network slice configuration controller 239 may identify an app 237 selected for operation at the UE 231. The network slice configuration controller 239 may identify one or more of the app identity, the app category, the user, e.g., according to a user preference and/or subscribed level of service, and so on. The network slice configuration controller 239 may further identify features of a network infrastructure available according to one or more of the RAN 234, the gNB 232, the backhaul network 235, the mobile core network 233, and possibly one or more of the data network 236 and/or the corresponding application server 238. The network slice configuration controller 239 may identify a corresponding first slice of the network, e.g., slice A 240a for App A 237a.

It is envisioned that in at least some embodiments, a number of radio resources to participate in CA of a particular data session may be determined according to a particular slice selection and/or configuration. The example sliced network 230 includes a carrier aggregation (CA) controller 241. The CA controller 241 may be in communication with one or more of the UE 231, the gNB 232, the mobile core network 233. Alternatively or in addition, the CA controller 241 may be in communication with the network slice configuration controller 239. In at least some scenarios, each of the different slices 240 has associated within it, a corresponding number of CA radio resources, e.g., corresponding numbers of PCCs and/or SCCs. In at least some embodiments, the CA controller 241 receives an identification and/or indication of a slice 240 associated with a particular app 237. The CA controller 241 determines a corresponding number of CA radio resources according to the corresponding slice 240, e.g., using a lookup table. The CA controller 241, in turn, facilitates a pre-configuration of an appropriate number of radio resources of one or more of the UE 231 and the gNB 232. The pre-configured radio resources may be activated immediately and/or in response to one or more other parameters, such as data buffer depths as describe in relation to FIG. 2B.

The sliced network 230 may include a machine learning system 242 (shown in phantom) that may be adapted to facilitate determinations of one or more of slice selections, slice configurations and/or radio number-slice associations. Machine learning may include, without limitation, and application of one or more neural networks that may be trained according to sample sets, applied to current usage applications, and revised, e.g., re-trained, as necessary, e.g., according to user feedback, controlled observation, and the like. Training data may be stored in training data repository 243 that is accessible by the machine learning system 242.

Figure 2D:
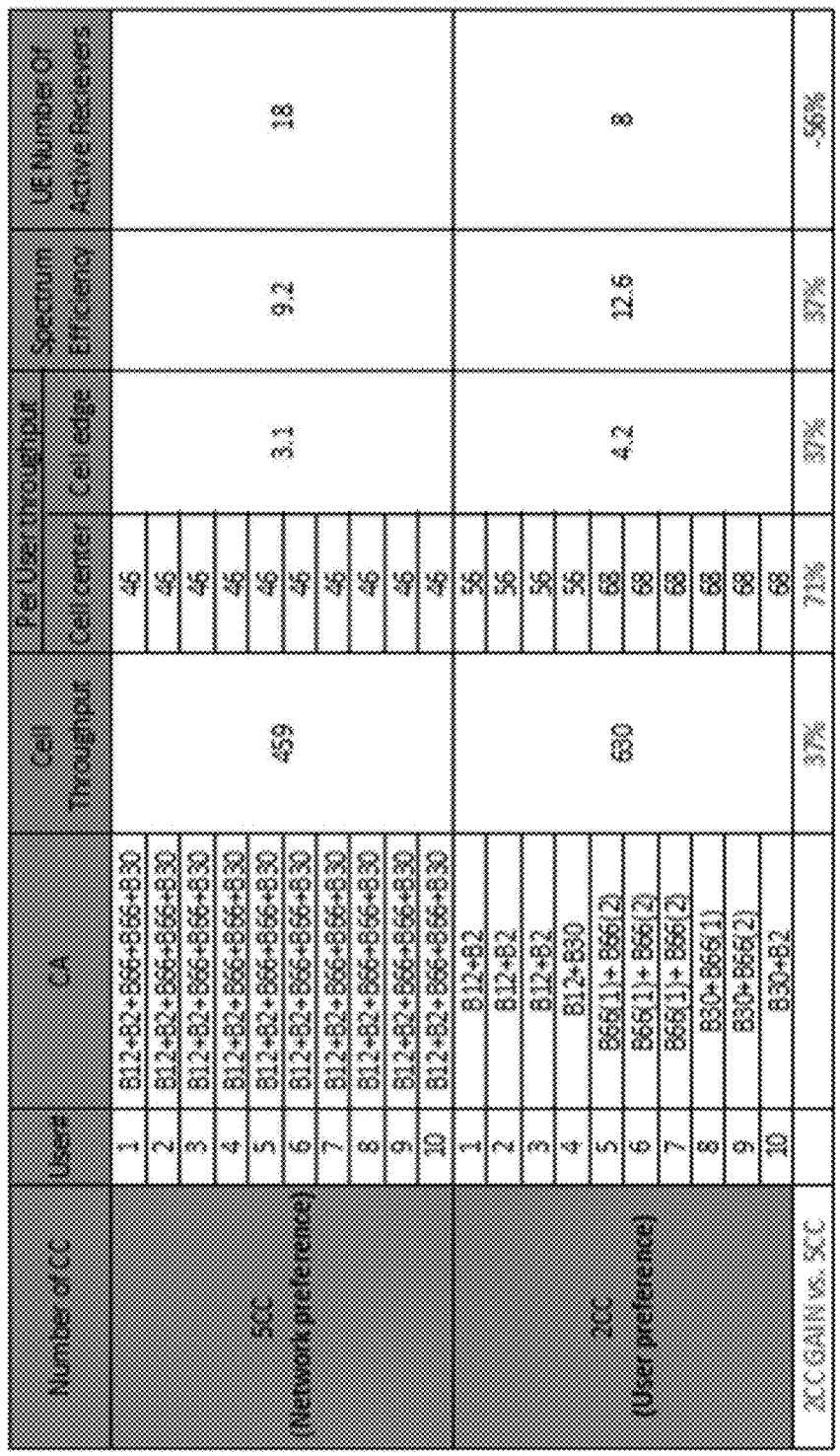
FIG. 2D is a table illustrating a comparison of a network preference and an example user preference for operation of a carrier aggregation system functioning within the communication network of FIGS. 1A, 1B, 2B and 2C.

FIG. 2D is a table 250 illustrating a comparison of a network preference and an example user preference for operation of a carrier aggregation system functioning within the communication network of FIGS. 1A, 1B, 2B and 2C. The table 250 illustrates a comparison of network selected CA configurations and user selected CA configurations for 10 different users. It is understood that the users may be for the same application for different users, different applications for the same users, different applications for different users, or any combination thereof. According to the example from which that tabulated results were obtained, the UE includes a maximum of five radio resources. Accordingly, the network selected CA configuration includes a pre-configuration of all five radio resources. In operation, the network selected CA will default to all of the available radio resources, i.e., 5CC, whenever CA is activated. The network selected scenarios will require overhead associated with pre-configuring and/or activating all five radio resources, as well as the overhead of operating the five radio resources, e.g., requiring all five receivers to be actively listening for data, reporting channel quality indicators (CQI), e.g., from the UE to the gNB, and the like.

The, so called, user selected configuration includes the various techniques disclosed herein, in which a number of CA channels and/or radio resources may be determined without requiring configuration of a maximum number of available radio resources. User-selected configurations may include identification of CA radio resources, e.g., XCC CA, in which "X" corresponds to the number of pre-configured radio resources. This determination may be made by the UE 211 (FIG. 2B), in which it may configure its own radio resources according to its determination and/or relay results of its determination to other devices, such as the gNB 221 (FIG. 2B). Alternatively or in addition, the, so called, user selected configuration may be determined by another device, such as the gNB and/or a separate CA controller 241 (FIG. 2C)

Figure 2E:
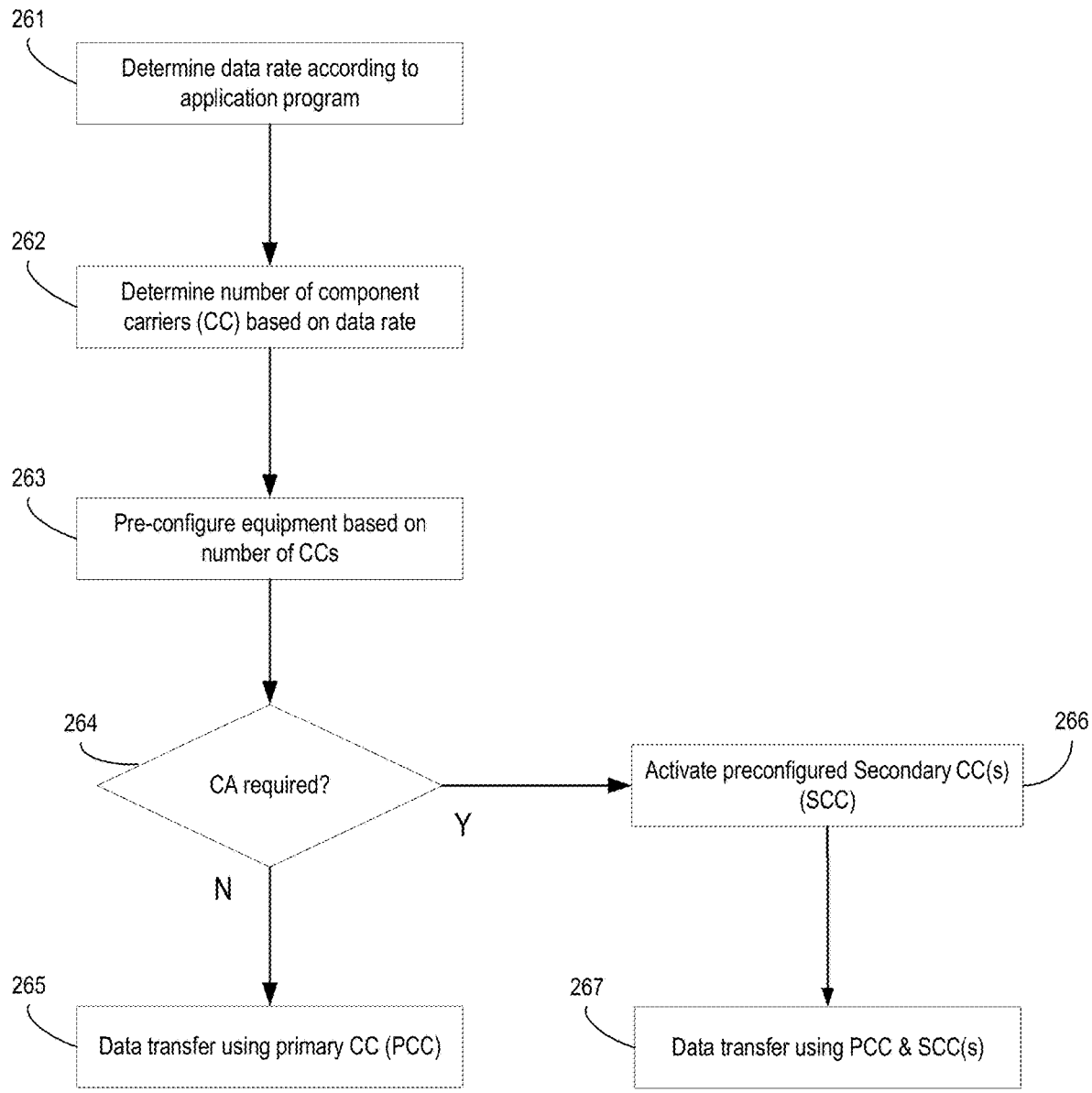
FIG. 2E depicts an illustrative embodiment of a process in accordance with various aspects described herein.

FIG. 2E depicts an illustrative embodiment of a process 260 in accordance with various aspects described herein. The process 260 includes determining a data rate at 261 according to an application program. Without limitation, the data rate may be determined according to a lookup table in which data rates that support an acceptable level of user experience have been predetermined according to a particular application program and/or class or type of application program. Alternatively or in addition, the data rates may depend upon one or more of a user preference, a subscription level, the particular user equipment supporting the application program and the like.

The process 260 further includes determining a number of component carriers (CC) at 262 based upon the determined data rate. The number and capacities of any component carriers may depend upon licensed spectrum available within a coverage area of the user equipment. Alternatively or in addition, the number and/or capacity of CCs may depend upon available capacity of a serving gNB, e.g., based upon one or more of network conditions, channel conditions, user traffic associated with other applications and/or other user equipment, a required QoS, reported CQI, associated KPI, and the like. In at least some instances, the CC may offer different bandwidths, such that a determined data rate may be serviced by different numbers of CCs. In such instances, preference may be made for CCs having bandwidths that reduce and/or otherwise minimize a number of CCs for a particular CA session. Alternatively or in addition, the number of CCs may be determined according to a particular slice of a sliced network that has been assigned to support the associated application program.

Equipment may be pre-configured at 263 according to a determined number of CCs. Pre-configuration may include preconfiguring radio resources of the user equipment, preconfiguring radio resources of the gNB and/or preconfiguring radio resources of both. The radio resources may be preconfigured in an active mode, in which all preconfigured radio resources participate in data communications according to a CA scenario regardless of an instantaneous data rate and/or regardless of any buffered data. Alternatively or in addition, the preconfigured radio resources may be activated on an as-needed basis. Namely, at least one radio resource may be active to support a PCC, while one or more of any other pre-configured radio resources may remain inactive until needed, e.g., according to an instantaneous bandwidth requirement and/or according to a data buffer level.

A test may be performed at 264 in which a determine is made as to whether CA is required, e.g., whether more than one CC is necessary. To the extent it is determined at 264 that multiple CCs are required, the process 260 activates and/or utilizes the determined number of CCs at 266, that together facilitate data exchange, e.g., between an application and a backend server. Data may then be exchanged at 267 using the activated number of CCs.

To the extent it is determined at 264 that multiple CCs are not required, the process 260 continues to facilitate a data exchange at 265, e.g., between the application and the backend server, using a single CC, e.g., a PCC.

As stated above, the fewer CC are active, the more UE can save its battery. In addition, due to devices' internal IMD (intermodulation distortion) between carriers and limited space in the device, fewer active CCs will also reduce interference.

When 5CC is active, the UE needs to report the 5CC downlink (DL) quality CQI/RI in 10 ms intervals for DL link adaptation, which results in a lot of signaling traffic from the UE to the network. The network has the feature to increase the interval up to 80 ms for 5CC, but it may impact 5CC performance if the network doesn't receive report from the UE in time to change downlink MCS (Modulation Code Scheme) assignment as a response to radio resource condition change.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, in one or more embodiments, different blocks can be performed by different devices including network device (s) and/or mobile device such as radio resource number detection being performed by the mobile device while CA requirement decision being performed by a network server.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 260 presented in FIGS. 1A, 1B, 2A, 2B, 2C, and 3. For example, virtualized communication network 300 can facilitate in whole or in part determining a data rate of a mobile application and configuring a minimum number of component carriers to participate in carrier aggregation of user plane data of the mobile application, without requiring that all available radio resources participate in the carrier aggregation.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1A), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The example network 300 may include one or more of a CA controller 301 and/or a slice configuration controller 302. The slice configuration controller 302 may be adapted to facilitate network slicing operations, e.g., as offered in 5G networking applications. The CA controller 301 may be adapted to perform any one or more of the various CA control features disclosed herein. For example, the CA controller 301 may be adapted to identify an application serviced by the network 300, to identify a corresponding data rate, to determine available carriers, e.g., based on a serving cell of a mobile cellular network, and to further identify a number of CCs to support CA operation serving the application.

In at least some embodiments, e.g., in which network slicing is employed, the CA controller 301 may be in communication with the slice configuration controller 302 to identify a particular network slice allocated to service the application. The CA controller 301 may be adapted to determine a number of CCs based on the assigned slice, such that the number of CCs facilitate performance of the slice and/or the application according to a predetermined QoS and/or according to a predetermined KPI.

Figure 4:
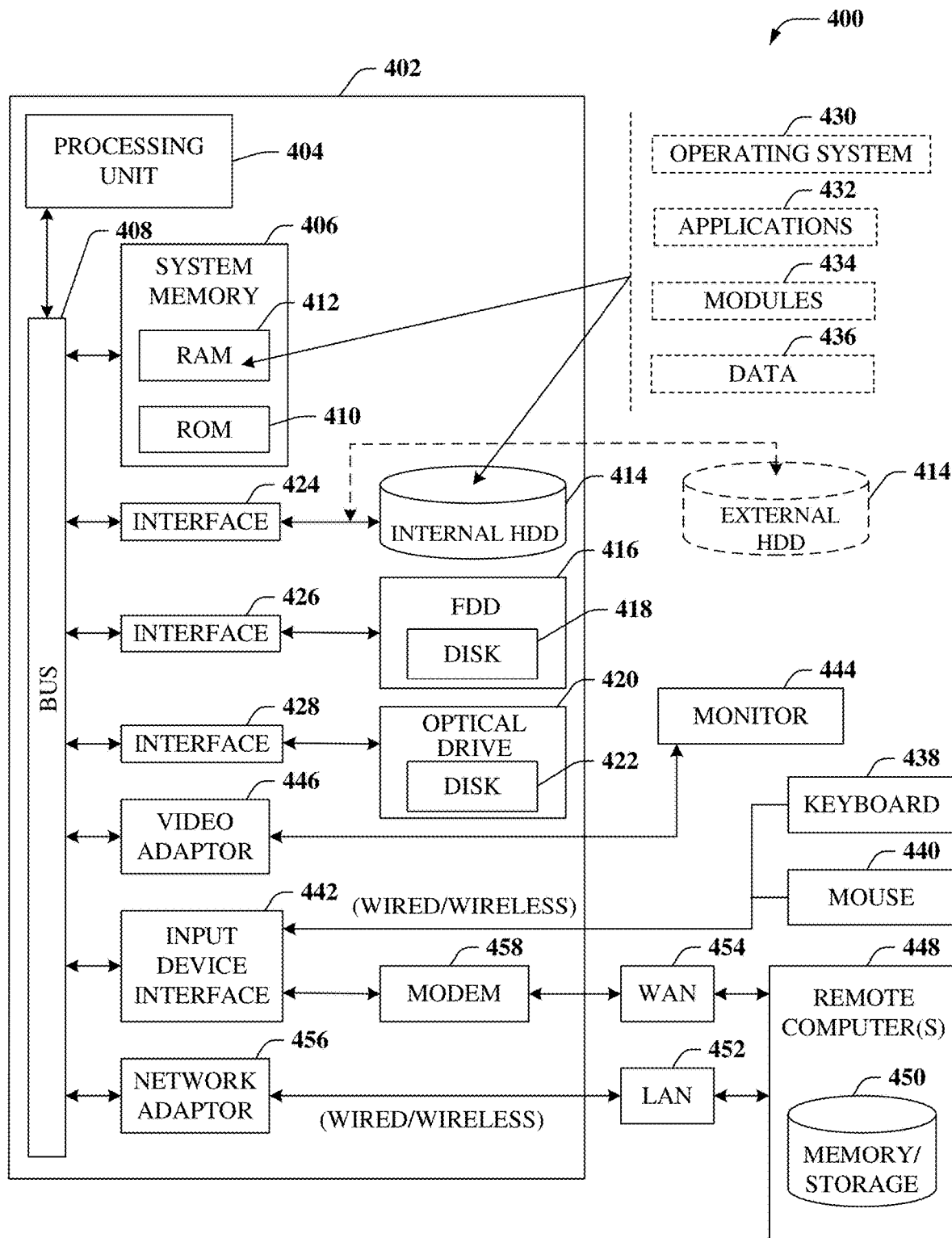
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a data rate of a mobile application and configuring a minimum number of component carriers to participate in carrier aggregation of user plane data of the mobile application, without requiring that all available radio resources participate in the carrier aggregation.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
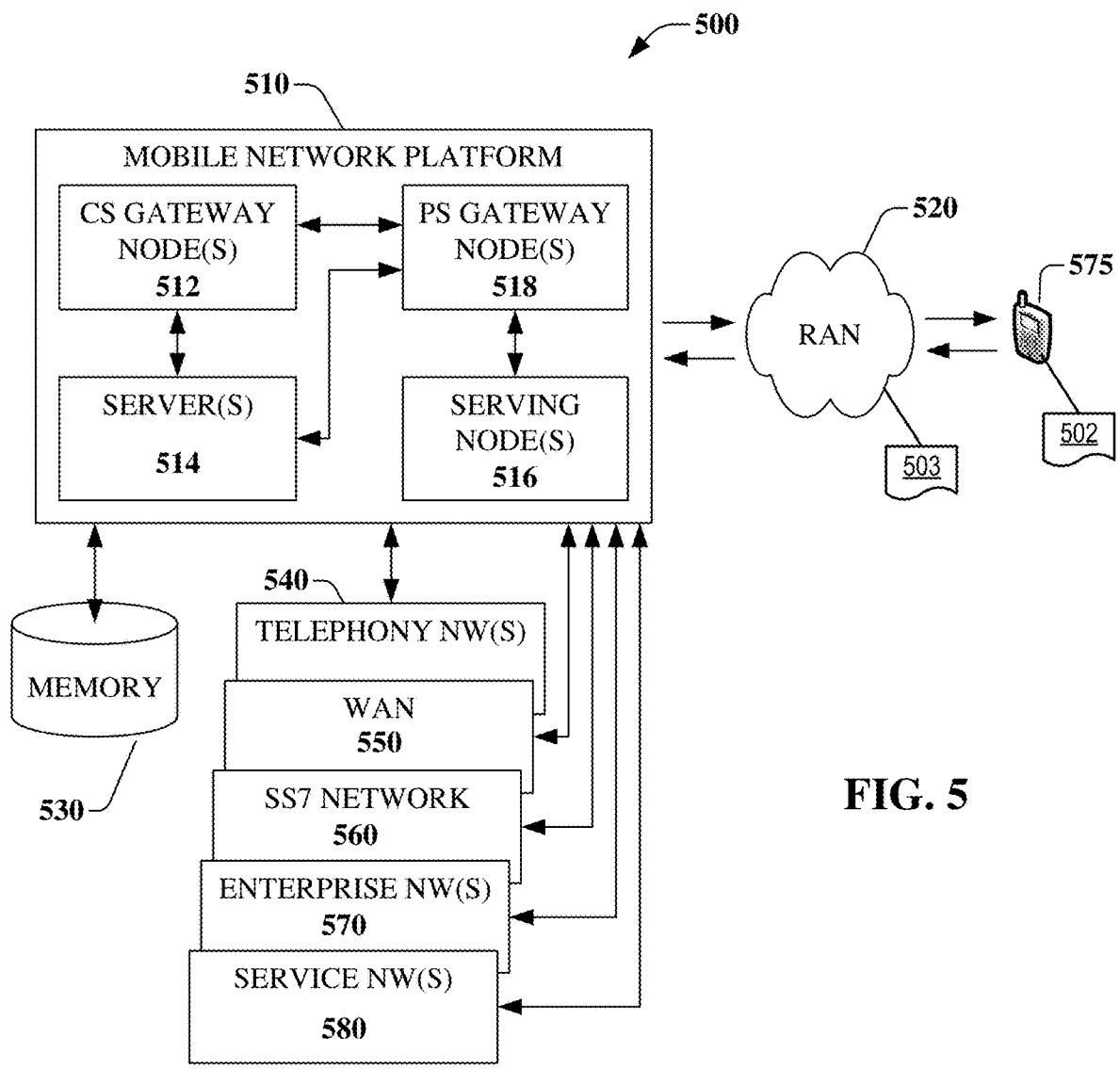
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a data rate of a mobile application and configuring a minimum number of component carriers to participate in carrier aggregation of user plane data of the mobile application, without requiring that all available radios participate in the carrier aggregation. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as the UE 575, e.g., a radiotelephone.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antennas networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the RAN 520 and/or the UE 575 may include components and/or functionality adapted to facilitate operation of CA according to the tailored techniques disclosed herein. By way of example, the RAN 520 may include equipment and/or functionality 503 adapted to monitor application usage, to determine corresponding data rates, and to identify number(s) of component carriers (CCs) of a CA scenario based on one or more of the application, the corresponding data rate and/or available carriers of the access point of the RAN 520. Alternatively or in addition, the UE 575 may include equipment and/or functionality 502 adapted to monitor application usage, to determine corresponding data rates, and to identify number(s) of component carriers (CCs) of a CA scenario based on one or more of the application, the corresponding data rate, available radios of the UE 575 and/or available carriers of the RAN 520.

Figure 6:
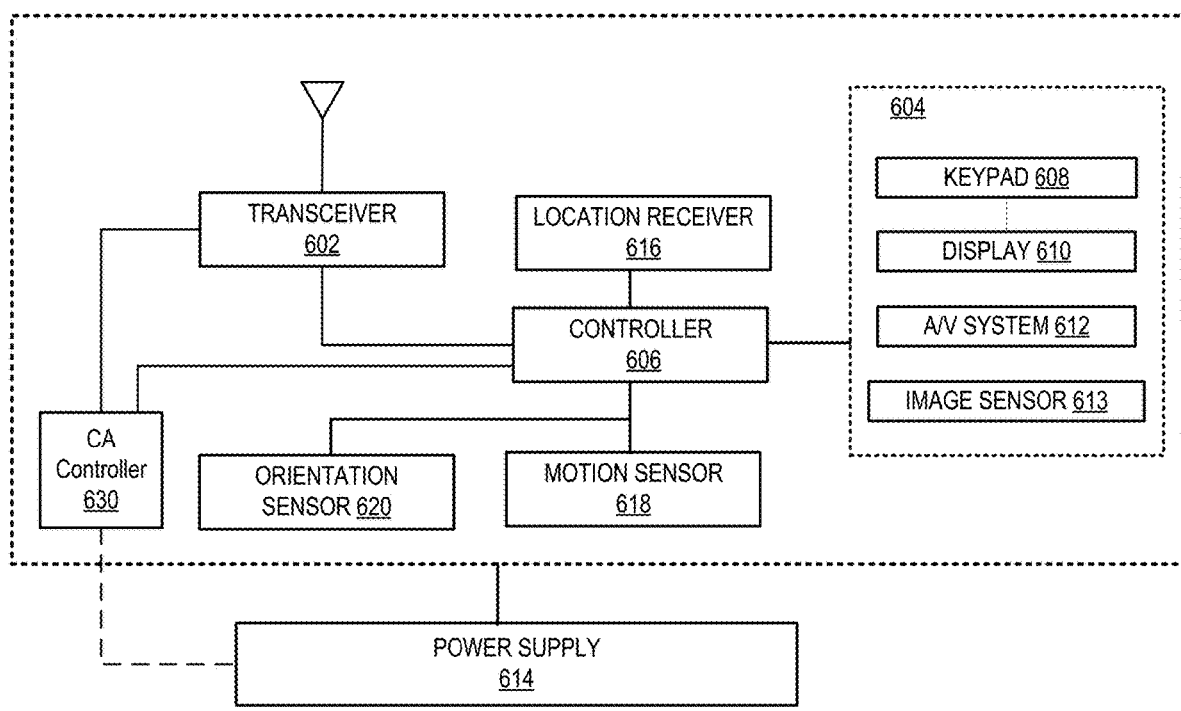
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a data rate of a mobile application and configuring a minimum number of component carriers to participate in carrier aggregation of user plane data of the mobile application, without requiring that all available radios participate in the carrier aggregation.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

In at least some embodiments, the transceiver 602 includes one or more radio resources. The radio resources may include any combination of transmitters, receivers and/or transceivers. Alternatively or in addition, the radio resources may include one or more of tuning networks, filters, antenna matching networks, antenna selectors, amplifiers, and the like. The radio resources may be adapted to support a single data communication channel. Alternatively or in addition, the radio resources may be adapted to support multiple data communication channels. It is understood that more than one radio receiver of the transceiver 602 may be configured to support CA operation of a downlink. Alternatively or in addition, more than one of the radio transmitters of the transceiver 602 may be configured to support CA operation of an uplink. The numbers and types of radio resources may vary according to one or more of uplink, downlink, and associated application programs. For example, four of five available receivers may support downlink CA operation for one app, while two of the five available receivers support CA operation for another app. Similarly, while one number of receivers may support CA operation of a downlink channel for one app, a different number of transmitters may support CA operation of an uplink channel for the same app.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

In at least some embodiments, the communication device 600 includes a CA controller 630. The CA controller 630 may be implemented as a separate, standalone controller, or a module of another subsystem of the communication device 600. For example, the CA controller 630 may be a module of the transceiver 602 and/or of the communication device controller 606. The CA controller 630 is generally adapted to facilitate CA operation of the communication device 600. CA operation may be determined, at least in part, according to a communication protocol, such as LTE 4G and/or 5G protocols. Alternatively or in addition, CA operation may be determined according to capabilities of the communication device 600 and/or other considerations, such as user preferences, device status, CQI, KPI and so on.

According to the illustrative example, the CA controller 630 is in communication with the transceiver 602 and the controller 606. The CA controller 630 may facilitate one or more of the example CA operations disclosed herein. For example, the CA controller 630 may determine one or more numbers of radio resources of the communication device 600 as preferred and/or maximum numbers of radio resources for use in CA applications. It is understood that the transceiver 602 may include multiple radios, e.g., five or seven radios. The CA controller 630 may establish and/or otherwise identify a number equal to or less than the number of available radios for participation in CA applications. In at least some embodiments, the identified number of available radio resources may depend upon one or more other conditions. Other conditions may include, without limitation, an associated application program, a user preference and/or subscription level, channel conditions, device power, and the like.

In at least some embodiments, the CA controller 630 may be in communication with the power supply 614. For example, the CA controller 630 may monitor a power level and/or a power capacity of the power supply 614. The CA controller 630 may modify CA operation according to the monitored power level and/or capacity. For example, the CA controller 630 may initiate and/or otherwise permit CA operation responsive to a power level and/or capacity exceeding a predetermined threshold. Alternatively or in addition, the CA controller 630 may determine a number of radio resources according to the power level and/or capacity. It is envisioned that a predetermined number of radios established for one application may be updated, e.g., increased and/or reduced, according to the power level and/or capacity.

Consider a situation in which four of five available radio resources of the transceiver 602 have been authorized to support data communications of one app under normal operating conditions. Should a power level and/or power capacity fall below a predetermined threshold, the CA controller 630 may reduce the number of authorized radio resources for the app, e.g., dropping the number from four to three or two. In extreme situations, the CA controller 630 may terminate and/or inhibit CA operation if the power level and/or capacity falls below a predetermined threshold. It is understood that more than one threshold may be established, in which a different number of radio resources may be authorized according to the different thresholds.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   identifying, by a processing system including a processor of a mobile device, a maximum number of a plurality of radio resources of the mobile device;
   detecting, by the processing system, activity of a mobile application of the mobile device;
   determining, by the processing system, a data rate requirement of the mobile application;
   comparing, by the processing system, the data rate requirement to a primary component capacity of a primary component carrier; and
   responsive to the data rate requirement exceeding the primary component capacity:
      identifying, by the processing system and according to the data rate requirement of the mobile application, a number of secondary component carriers providing a number of secondary component capacities, wherein a combination of the primary component capacity and the number of secondary component capacities is not less than the data rate requirement of the mobile application; and
      configuring, by the processing system, a number of radio resources of the plurality of radio resources according to the number of secondary component carriers to obtain a number of configured radio resources, wherein the number of radio resources does not exceed the maximum number of the plurality of radio resources, and wherein the data rate requirement of the mobile application is accommodated by the combination of the primary component capacity and the number of secondary component capacities.

2. The method of claim 1, wherein the number of radio resources of the plurality of radio resources is less than the maximum number of the plurality of radio resources.

3. The method of claim 2, further comprising:
activating, by the processing system, the number of radio resources of the plurality of radio resources of the mobile device to obtain a number of activated radio resources, wherein the number of activated radio resources remain activated without regard to an amount of data buffered during the activity of the mobile application.

4. The method of claim 2, wherein the number of configured radio resources are activated responsive to a fill level of a data buffer exceeding a threshold, the data buffer supporting data communications between the mobile application and a radio access terminal.

5. The method of claim 1, wherein the activity of the mobile application comprises a request for data communications.

6. The method of claim 1, wherein the determining of the data rate requirement further comprises:
identifying, by the processing system, an application type of the mobile application; and
identifying, by the processing system, the data rate requirement according to the application type.

7. The method of claim 1, further comprising:
identifying, by the processing system, a subscription level of a plurality of subscription levels, wherein the data rate requirement is further identified according to the subscription level.

8. The method of claim 1, further comprising:
determining, by the processing system, a plurality of available secondary component carriers having different secondary component carrier capacities, wherein the identifying of the number of secondary component carriers further comprises:
selecting, by the processing system, the number of secondary component carriers according to the different secondary component carrier capacities to obtain a minimum number of secondary component carriers whose capacities, together with the primary component capacity, accommodate the data rate requirement of the mobile application.

9. The method of claim 1, wherein the plurality of radio resources comprises a plurality of radio receivers, and wherein the data rate requirement comprises a downlink data rate from a radio access node to the mobile device.

10. The method of claim 1, further comprising:
monitoring, by the processing system, a power capacity of a power source of the mobile device, wherein the power source supplies power to the plurality of radio resources, wherein the identifying of the number of secondary component carriers is further according to the power capacity.

11. The method of claim 1, wherein responsive to the detecting of the activity of the mobile application, the mobile device is attached to a network slice of a 5G network, the network slice comprising a sliced radio access network portion providing the primary component carrier and the number of secondary component carriers.

12. A device, comprising:
a processing system including a processor; and
a memory that stores executable instructions that, when executed by the processing system, facilitate performance of operations, the operations comprising:
identifying a maximum number of a plurality of radio resources of a mobile device;
detecting activity of an application;
determining a data throughput requirement of the application;
comparing the data throughput requirement to a first data throughput capacity of a first component carrier; and
responsive to the data throughput requirement exceeding the first data throughput capacity:
determining, according to the data throughput requirement of the application, a number of secondary component carriers providing a number of secondary data throughput capacities, wherein a combination of the first data throughput capacity and the number of secondary data throughput capacities is not less than the data throughput requirement of the application; and
configuring a number of radio resources of the plurality of radio resources according to the number of secondary component carriers to obtain a number of configured radio resources, wherein the number of configured radio resources does not exceed the maximum number of the plurality of radio resources, and wherein the data throughput requirement is accommodated by the combination of the first data throughput capacity and the number of secondary data throughput capacities.

13. The device of claim 12, wherein the number of radio resources of the plurality of radio resources is less than the maximum number of the plurality of radio resources.

14. The device of claim 13, wherein the operations further comprise:
activating the number of radio resources of the plurality of radio resources of the mobile device to obtain a number of activated radio resources, wherein the number of activated radio resources remain activated without regard to an amount of data buffered during the activity of the application.

15. The device of claim 13, wherein the number of configured radio resources are activated responsive to a fill level of a data buffer exceeding a threshold, the data buffer supporting data communications between the application and a radio access terminal.

16. The device of claim 12, wherein the determining of the data throughput requirement further comprises:
identifying, by the processing system, an application type of the application; and
identifying, by the processing system, the data throughput requirement according to the application type.

17. A non-transitory, machine-readable medium, comprising executable instructions that, when executed by a processing system including a processor, facilitate performance of operations, the operations comprising:
identifying a number of a plurality of radio resources provided within a mobile device;
detecting activity of an application;
determining a data communication requirement of the application;
comparing the data communication requirement to a first communication capacity of a first component carrier; and
responsive to the data communication requirement exceeding the first communication capacity:
identifying, according to the data communication requirement, a number of secondary component carriers providing a number of secondary communication capacities, wherein a combination of the first communication capacity and the number of secondary communication capacities is not less than the data communication requirement; and configuring a group of the plurality of radio resources according to the number of secondary component carriers to obtain a number of configured radio resources, wherein a number of the group of the plurality of radio resources does not exceed the number of the plurality of radio resources, and wherein the data communication requirement is accommodated by the combination of the first communication capacity and the number of secondary communication capacities.

18. The non-transitory, machine-readable medium of claim 17, wherein the operations further comprise:
determining a plurality of available secondary component carriers having different secondary component carrier capacities, wherein the identifying of the number of secondary component carriers further comprises:
selecting the number of secondary component carriers according to the different secondary component carrier capacities to obtain a minimum number of secondary component carriers whose capacities, together with the first communication capacity, accommodate the data communication requirement of the application.

19. The non-transitory, machine-readable medium of claim 17, wherein the operations further comprise:
monitoring a power capacity of a power source of the mobile device, wherein the power source supplies power to the plurality of radio resources, wherein the identifying of the number of secondary component carriers is further according to the power capacity.

20. The non-transitory, machine-readable medium of claim 17, wherein responsive to the detecting of the activity of the application, the mobile device is attached to a network slice of a 5G network, the network slice comprising a sliced radio access network portion providing the first component carrier and the number of secondary component carriers.

* * * * *